(12) United States Patent
Ouchi et al.

(10) Patent No.: US 9,232,535 B2
(45) Date of Patent: Jan. 5, 2016

(54) WIRELESS COMMUNICATION SYSTEM, BASE STATION APPARATUS, MOBILE STATION APPARATUS, WIRELESS COMMUNICATION METHOD AND INTEGRATED CIRCUIT

(75) Inventors: Wataru Ouchi, Osaka (JP); Tatsushi Aiba, Osaka (JP); Yosuke Akimoto, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 160 days.

(21) Appl. No.: 13/702,620

(22) PCT Filed: May 30, 2011

(86) PCT No.: PCT/JP2011/062380
§ 371 (c)(1),
(2), (4) Date: Jan. 29, 2013

(87) PCT Pub. No.: WO2011/155361
PCT Pub. Date: Dec. 15, 2011

(65) Prior Publication Data
US 2013/0121280 A1    May 16, 2013

(30) Foreign Application Priority Data

Jun. 10, 2010    (JP) ................................. 2010-132630

(51) Int. Cl.
*H04J 3/12* (2006.01)
*H04W 72/14* (2009.01)
(Continued)

(52) U.S. Cl.
CPC .............. *H04W 72/14* (2013.01); *H04L 5/001* (2013.01); *H04L 5/0048* (2013.01); *H04L 25/0224* (2013.01); *H04L 5/0044* (2013.01); *H04L 5/0053* (2013.01); *H04L 25/0204* (2013.01)

(58) Field of Classification Search
CPC ..... H04W 72/00; H04W 72/04; H04W 72/10; H04W 72/12; H04W 72/14
USPC ................................... 370/328–332; 455/403
See application file for complete search history.

(56) References Cited

U.S. PATENT DOCUMENTS

| 8,565,168 B2 | 10/2013 | Papasakellariou et al. |
| 2009/0181687 A1* | 7/2009 | Tiirola et al. ................. 455/450 |

(Continued)

FOREIGN PATENT DOCUMENTS

WO    WO 2010/036053 A2    4/2010

OTHER PUBLICATIONS

Alcatel-Lucent, Alcatel-Lucent Shanghai Bell, "Triggering of Dynamic Aperiodic SRS", 3GPP TSG-RAN WG1 #61 R1-102797, Montreal, Canada, May 10-14, 2010, 3 pages.

(Continued)

*Primary Examiner* — Kevin C Harper
(74) *Attorney, Agent, or Firm* — Birch, Stewart, Kolasch & Birch, LLP

(57) ABSTRACT

It is possible to perform effective communication based on an A-SRS transmitted from a mobile station apparatus. A base station apparatus: notifies the mobile station apparatus of control information for setting, to the mobile station apparatus, whether to transmit a first sounding reference signal assigned in a physical uplink shared channel resource or to transmit a second sounding reference signal assigned in a resource different from the physical uplink shared channel resource; and notifies the mobile station apparatus of an uplink grant including an indication of transmission of a sounding reference signal. When receiving the indication of transmission of the sounding reference signal included in the uplink grant, the mobile station apparatus transmits the first sounding reference signal to the base station apparatus when the transmission of the first sounding reference signal is set by transmission control information, and transmits the second sounding reference signal to the base station apparatus when the transmission of the second sounding reference signal is set by the transmission control information.

28 Claims, 9 Drawing Sheets

(51) Int. Cl.
*H04L 5/00* (2006.01)
*H04L 25/02* (2006.01)

(56) References Cited

U.S. PATENT DOCUMENTS

| | | | |
|---|---|---|---|
| 2009/0316676 A1* | 12/2009 | Kolding et al. | 370/345 |
| 2010/0080187 A1 | 4/2010 | Papasakellariou et al. | |
| 2010/0246561 A1* | 9/2010 | Shin et al. | 370/345 |
| 2011/0199944 A1* | 8/2011 | Chen et al. | 370/280 |
| 2011/0200143 A1* | 8/2011 | Koo et al. | 375/299 |
| 2012/0252474 A1* | 10/2012 | Tiirola et al. | 455/450 |
| 2014/0016602 A1 | 1/2014 | Papasakellariou et al. | |

OTHER PUBLICATIONS

Catt, "SRS Enhancements for LTE-A UL Transmission", 3GPP TSG RAN WG1 Meeting #59bis R1-100075, Valencia, Spain, Jan. 18-22, 2010, 6 pages.

Ericsson, "Carrier Aggregation in LTE-Advanced", TSG-RAN WG1 #53bis R1-082468, Warsaw, Poland, Jun. 30-Jul. 4, 2008, 6 pages.

Ericsson, ST-Ericsson, "Aperiodic Sounding Reference Signals for Release 10", TSG RAN WG1 #61 R1-103215, Montreal, Canada, May 10-14, 2010, 3 pages.

International Search Report issued in PCT/JP2011/062380, dated Sep. 6, 2011.

Motorola, "LTE-A Dynamic Aperiodic SRS—Triggering, Duration, Timing and Carrier Aggregation", 3GPP TSG RAN WG1 Meeting #61 R1-103187, Montreal, Canada, May 10-14, 2010, 4 pages.

Motorola, CMCC, "Aperiodic SRS Design for LTE-A", 3GPP TSG RAN1#61 R1-103156, Montreal, Canada, May 10-14, 2010, 2 pages.

Nokia Siemens Networks, Nokia, "Dynamic Aperiodic SRS", 3GPP TSG RAN WG1 Meeting #61 R1-102966, Montreal, Canada, May 10-14, 2010, 2 pages.

Qualcomm Incorporated, "Further Details on Aperiodic Dynamic SRS", 3GPP TSG-RAN WG1 #61 R1-102765, Montreal, Canada, May 10-14, 2010, 3 pages.

Samsung, "Configuring SRS Transmissions in Rel. 10", 3GPP TSG RAN WG1 #59bis R1-100133, Valencia, Spain, Jan. 19-23, 2010, 3 pages.

Texas Instruments, "Signaling Considerations for Dynamic Aperiodic SRS", 3GPP TSG RAN WG1 #61 R1-102830, Montreal, Canada, May 10-14, 2010, 4 pages.

* cited by examiner

IN CASE OF 2BIT-SRS ACTIVATION FIELD (SRS REQUEST FIELD)
"00"="NOT TRANSMITTING OF A-SRS"
"01"="1ST A-SRS TRANSMISSION"
"10"="2ND A-SRS TRANSMISSION"
"11"="TRANSMISSION OF 2ND A-SRS BASED
ON A-SRS CONFIGURATION INFORMATION INCLUDED IN DCI FORMAT"

WIRELESS COMMUNICATION SYSTEM, BASE STATION APPARATUS, MOBILE STATION APPARATUS, WIRELESS COMMUNICATION METHOD AND INTEGRATED CIRCUIT

TECHNICAL FIELD

The present invention relates to a wireless communication system configured by a mobile station apparatus and a base station apparatus, and more particular, to a method for controlling transmission of a reference signal for channel estimation of the mobile station apparatus.

BACKGROUND ART

A radio access system and the evolution of a radio network, of cellular mobile communication (hereinafter, also referred to as "long term evolution (LTE)" or "evolved universal terrestrial radio access (EUTRA)"), and a radio access system and a radio network that utilize a frequency band wider than that of LTE to realize faster data communication (hereinafter, also referred to as "long term evolution-advanced (LTE-A)" or "advanced evolved universal terrestrial radio access (A-EUTRA)") have been conventionally studied in 3rd generation partnership project (3GPP).

As communication systems in LTE, an OFDMA (Orthogonal Frequency Division Multiple Access) system performing user multiplexing by using subcarriers orthogonal to each other, and an SC-FDMA (Single Carrier-Frequency Division Multiple Access) system have been studied. That is, in a downlink, the OFDMA system that is a multi-carrier communication system has been proposed, and in an uplink, the SC-FDMA system that is a single-carrier communication system has been proposed.

In contrast, as communication systems in LTE-A, in a downlink, it has been studied to introduce the OFDMA system, and in an uplink, it has been studied to introduce a clustered-SC-FDMA (also referred to as Clustered-Single Carrier-Frequency Division Multiple Access, DFT-S-OFDM with Spectrum Division Control, or DFT-precoded OFDM) system in addition to the SC-FDMA. Here, in LTE and LTE-A, the SC-FDMA system and the clustered-SC-FDMA system proposed as uplink communication systems have characteristics that can suppress PAPR (Peak to Average Power Ratio, or transmission power) during data (information) transmission to be low due to the characteristics of the single-carrier communication system (due to single-carrier characteristics).

Furthermore, frequency bands used in ordinary wireless communication systems are contiguous in LTE-A, whereas it has been proposed that a plurality of contiguous and/or discontiguous frequency bands (hereinafter, also referred to as component carriers (CCs) or carrier components (CCs)) is compositely used, and thus, is operated as one wide frequency band (also referred to as a carrier aggregation). Furthermore, it has also been proposed that a frequency band used in downlink transmission and a frequency band used in uplink transmission have different frequency bandwidths (an asymmetric carrier aggregation) so that a base station apparatus and a mobile station apparatus (UE: User Equipment) use more flexibly a wide frequency band to perform communications (Non-patent document 1).

FIG. 6 is a view illustrating a carrier-aggregated wireless communication system in the conventional art. It is also referred to as symmetric carrier aggregation that a frequency band used in downlink (DL) communication and a frequency band used in uplink (UL) communication as shown in FIG. 6 have the same frequency bandwidth. As shown in FIG. 6 a base station apparatus and a mobile station apparatus can perform communication in a wide frequency band configured by a plurality of component carriers by compositely using the plurality of component carriers that is contiguous and/or discontiguous frequency bands.

FIG. 6 shows that as an example, a frequency band (or DL system band (DL system bandwidth)) used in downlink transmission that has a bandwidth of 100 MHz is configured by five downlink component carriers (DCC1: Downlink Component Carrier 1, DCC2, DCC3, DCC4, and DCC5) each having a bandwidth of 20 MHz. Furthermore, as an example, FIG. 6 shows that a frequency band (or UL system band (UL system bandwidth)) used in uplink transmission that has a bandwidth of 100 MHz is configured by five uplink component carriers (UCC1: Uplink Component Carrier 1, UCC2, UCC3, UCC4, and UCC5) each having a bandwidth of 20 MHz.

In FIG. 6, downlink channels such as a physical downlink control channel (PDCCH) and a physical downlink shared channel (PDSCH) are assigned in respective downlink component carriers.

The base station apparatus allocates (schedules) downlink control information (DCI) for transmitting a downlink transport block transmitted by using a PDSCH to the mobile station apparatus by using a PDCCH. The base station apparatus transmits a downlink transport block to the mobile station apparatus by using a PDSCH. Here, in FIG. 6, the base station apparatus can transmit, to the mobile station apparatus, up to five downlink transport blocks (or PDSCHs) at maximum in the same subframe.

Furthermore, uplink channels such as a physical uplink control channel (PUCCH) and a physical uplink shared channel (PUSCH) are assigned in respective uplink component carriers.

The mobile station apparatus transmits, to the base station apparatus, uplink control information (UCI) such as channel state information (CSI) indicating a downlink channel state, information indicating an ACK/NACK (Positive Acknowledgement/Negative Acknowledgement) in HARQ for a downlink transport block, and a scheduling request (SR) by using a PUCCH and/or a PUSCH. Here, in FIG. 6, the mobile station apparatus can transmit, to the base station apparatus, up to five uplink transport blocks (or PUSCHs) at maximum in the same subframe.

Similarly, FIG. 7 is a view illustrating an asymmetrically carrier-aggregated wireless communication system in the conventional art. As shown in FIG. 7, the base station apparatus and the mobile station apparatus can perform communication in a wide frequency band: by causing a frequency band used in downlink transmission and a frequency band used in uplink transmission to have different frequency bandwidths; and by compositely using component carriers that are contiguous and/or discontiguous frequency bands constituting these frequency bands.

FIG. 7 shows that as an example, a frequency band having a bandwidth of 100 MHz and used in downlink transmission is configured by five downlink component carriers (DCC1, DCC2, DCC3, DCC4, and DCC5) each having a bandwidth of 20 MHz. Furthermore, as an example, FIG. 7 shows that a frequency band having a bandwidth of 40 MHz and used in uplink transmission is configured by two uplink component carriers (UCC1 and UCC2) each having a bandwidth of 20 MHz.

In FIG. 7, downlink/uplink channels are assigned in respective downlink/uplink component carriers. The base station apparatus allocates (schedules) a PDSCH to the mobile station apparatus by using a PDCCH, and transmits a downlink transport block to the mobile station apparatus by using the PDSCH. Here, in FIG. 7, the base station apparatus can transmit, to the mobile station apparatus, up to five downlink transport blocks (or PDSCHs) at maximum in the same subframe.

Furthermore, the mobile station apparatus transmits, to the base station apparatus, uplink control information such as channel state information, information indicating an ACK/NACK in HARQ for a downlink transport block, and a scheduling request by using a PUCCH and/or a PUSCH. Here, in FIG. 7, the mobile station apparatus can transmit, to the base station apparatus, up to two uplink transport blocks (or PUSCHs) at maximum in the same subframe.

In LTE-A, a sounding reference signal (A-SRS: Aperiodic Sounding Reference Signal) transmitted only when a transmission request is notified by a PDCCH from the base station apparatus has been proposed. By including A-SRS transmission indication information (A-SRS activation/deactivation) in a downlink control information (DCI) format (also referred to as a DCI format), the mobile station apparatus can determine whether or not the base station apparatus requests transmission of an A-SRS, and can dynamically perform transmission control of an A-SRS. Furthermore, it has been proposed that the base station apparatus: indicates the mobile station apparatus to perform transmission of an A-SRS, by using a downlink control information format (also referred to as a DCI format, a downlink grant, or a downlink assignment) for a downlink; and indicates the mobile station apparatus to perform transmission of an A-SRS, by using a downlink control information format (also referred to as a DCI format, an UL grant, or an uplink assignment) for an uplink. Furthermore, it has been proposed to indicate an indication of transmission of an A-SRS by one bit (or multiple bits) of an uplink grant or a downlink assignment, or a predetermined code point (Non-patent document 2).

RELATED ART DOCUMENTS

Non-Patent Documents

Non-patent document 1: "Carrier aggregation in LTE-Advanced", R1-082468, 3GPP TSGRAN WG1 Meeting #53bis, Jun. 30-Jul. 4, 2008.
Non-patent document 2: "LTE-A Dynamic Aperiodic SRS—Duration, Timing, and Carrier Aggregation", R1-103187, 3GPP TSG-RAN1 Meeting #61, May 10-14, 2010.

DISCLOSURE OF THE INVENTION

Problems to be Solved by the Invention

However, in the conventional art, a mobile station apparatus indicated to perform transmission of an A-SRS by a base station apparatus transmits an A-SRS to the base station apparatus without switching parameters used in A-SRS transmission. That is, the mobile station apparatus transmits an A-SRS to the base station apparatus by assigning the A-SRS in a PUSCH resource (a part of the PUSCH resource) scheduled by the base station apparatus (inband A-SRS transmission). For example, the mobile station apparatus transmits an A-SRS to the base station apparatus in the transmission bandwidth of the same bandwidth as a PUSCH resource scheduled by the base station apparatus.

Furthermore, the mobile station apparatus transmits the A-SRS to the base station apparatus by assigning an A-SRS in a resource set in setting information different from setting information for a PUSCH resource by the base station apparatus (outband A-SRS transmission). For example, the mobile station apparatus transmits an A-SRS to the base station apparatus in a wide transmission bandwidth set by the base station apparatus.

Here, when the mobile station apparatus performs communication with the base station apparatus in an environment of good communication quality, even if an A-SRS is transmitted inband, the base station apparatus can perform channel estimation only within the range of a PUSCH resource scheduled for the mobile station apparatus, cannot provide the improvement of communication quality due to frequency selection scheduling, and thus, cannot perform effective communication. Furthermore, when the mobile station apparatus performs communication with the base station apparatus in an environment of poor communication quality, even if an A-SRS is transmitted outband, the accuracy of channel estimation by the base station apparatus is degraded, and it is impossible to perform effective communication. That is, in the conventional art, since the mobile station apparatus indicated to perform transmission of an A-SRS by the base station apparatus transmits an A-SRS to the base station apparatus without switching parameters used in A-SRS transmission, there has been a problem that it is impossible to perform effective communication between the base station apparatus and the mobile station apparatus.

The present invention has been made in view of the above-described points, and has an objective to provide a wireless communication system, a base station apparatus, a mobile station apparatus, a wireless communication method, and an integrated circuit that can perform effective communication between the base station apparatus and the mobile station apparatus based on an A-SRS transmitted from the mobile station apparatus.

Means of Solving the Problems (1) In order to achieve the above-described objective, the present invention takes measures as described below. That is, according to the present invention, there is provided a wireless communication system in which a base station apparatus and a mobile station apparatus perform wireless communication, wherein the base station apparatus: notifies the mobile station apparatus of a radio resource control signal including transmission control information for setting, to the mobile station apparatus, whether to transmit a first sounding reference signal assigned in a physical uplink shared channel resource, or to transmit a second sounding reference signal assigned in a resource different from the physical uplink shared channel resource; and notifies the mobile station apparatus of an uplink grant including an indication of transmission of the sounding reference signal, and wherein the mobile station apparatus, when the indication of transmission of the sounding reference signal included in the uplink grant is received: transmits the first sounding reference signal to the base station apparatus, when the transmission of the first sounding reference signal is set by the transmission control information; and transmits the second sounding reference signal to the base station apparatus, when the transmission of the second sounding reference signal is set by the transmission control information.

(2) According to the present invention, there is provided a wireless communication system in which a base station apparatus and a mobile station apparatus perform wireless communication, wherein the base station apparatus notifies the mobile station apparatus of an uplink grant including control information indicating whether to transmit a first sounding reference signal assigned in a physical uplink shared channel resource, or to transmit a second sounding reference signal assigned in a resource different from the physical uplink shared channel resource, and wherein the mobile station apparatus transmits the first sounding reference signal or the second sounding reference signal to the base station apparatus, based on the control information included in the uplink grant.

(3) According to the present invention, there is provided a wireless communication system in which a base station apparatus and a mobile station apparatus perform wireless communication, wherein the base station apparatus: sets transmission indication information included in an uplink grant as a first value, when indicating the mobile station apparatus to perform transmission of a first sounding reference signal assigned in a physical uplink shared channel resource; sets the transmission indication information as a second value, when indicating the mobile station apparatus to perform transmission of a second sounding reference signal assigned in a resource different from the physical uplink shared channel resource; and notifies the mobile station apparatus of the uplink grant including the transmission indication information set at the first value or the second value, and wherein the mobile station apparatus: transmits the first sounding reference signal to the base station apparatus, when the transmission indication information included in the uplink grant is the first value; and transmits the second sounding reference signal to the base station apparatus, when the transmission indication information included in the uplink grant is the second value.

(4) According to the present invention, there is provided a wireless communication system in which a base station apparatus and a mobile station apparatus perform wireless communication, wherein the base station apparatus: sets transmission indication information of one bit included in an uplink grant at a predetermined value, when indicating the mobile station apparatus to perform transmission of a first sounding reference signal assigned in a physical uplink shared channel resource; sets first control information included in the uplink grant at a predetermined code point, when indicating the mobile station apparatus to perform transmission of a second sounding reference signal assigned in a resource different from the physical uplink shared channel resource; sets the indication of transmission of the sounding reference signal with the transmission indication information or the first control information; notifies the mobile station apparatus of the uplink grant including the transmission indication information set at the predetermined value or the first control information set at the predetermined code point; and notifies the mobile station apparatus of the uplink grant including the indication of transmission of the sounding reference signal, and wherein the mobile station apparatus: transmits the first sounding reference signal to the base station apparatus, when the transmission indication information included in the uplink grant indicates the indication of transmission of the sounding reference signal; and transmits the second sounding reference signal to the base station apparatus, when the first control information included in the uplink grant is the predetermined code point.

(5) According to the present invention, there is provided the wireless communication system according to (1), wherein the base station apparatus sets the indication of transmission of the sounding reference signal with transmission indication information of one bit or first control information that is a predetermined code point.

(6) According to the present invention, there is provided the wireless communication system according to (1), wherein the base station apparatus sets the transmission control information for each uplink component carrier.

(7) According to the present invention, there is provided the wireless communication system according to (4), wherein the base station apparatus notifies the mobile station apparatus of the uplink grant including a parameter of the second sounding reference signal and the first control information, and wherein the mobile station apparatus transmits, in accordance with the uplink grant, to the base station apparatus, the second sounding reference signal in which the parameter included in the uplink grant is set, when the first control information is the predetermined code point.

(8) According to the present invention, there is provided a base station apparatus that performs wireless communication with a mobile station apparatus. The base station apparatus at least includes: a unit that notifies the mobile station apparatus of a radio resource control signal including transmission control information for setting, to the mobile station apparatus, whether to transmit a first sounding reference signal assigned in a physical uplink shared channel resource, or to transmit a second sounding reference signal assigned in a resource different from the physical uplink shared channel resource; and a unit that notifies the mobile station apparatus of an uplink grant including an indication of transmission of a sounding reference signal.

(9) According to the present invention, there is provided a base station apparatus that performs wireless communication with a mobile station apparatus. The base station apparatus at least includes a unit that notifies the mobile station apparatus of an uplink grant including control information indicating whether to transmit a first sounding reference signal assigned in a physical uplink shared channel resource, or to transmit a second sounding reference signal assigned in a resource different from the physical uplink shared channel resource.

(10) According to the present invention, there is provided a base station apparatus that performs wireless communication with a mobile station apparatus. The base station apparatus at least includes: a unit that sets transmission indication information included in an uplink grant as a first value, when indicating the mobile station apparatus to perform transmission of a first sounding reference signal assigned in a physical uplink shared channel resource; a unit that sets the transmission indication information as a second value, when indicating the mobile station apparatus to perform transmission of a second sounding reference signal assigned in a resource different from the physical uplink shared channel resource; and a unit that notifies the mobile station apparatus of the uplink grant including the transmission indication information set at the first value or the second value.

(11) According to the present invention, there is provided a base station apparatus that performs wireless communication with a mobile station apparatus. The base station apparatus at least includes: a unit that sets transmission indication information of one bit included in an uplink grant at a predetermined value, when indicating the mobile station apparatus to perform transmission of a first sounding reference signal assigned in a physical uplink shared channel resource; a unit that sets first control information included in the uplink grant at a predetermined code point, when indicating the mobile station apparatus to perform transmission of a second sounding reference signal assigned in a resource different from the physical uplink shared channel resource; a unit that sets the indication of transmission of the sounding reference signal with the transmission indication information or the first control information; a unit that notifies the mobile station apparatus of the uplink grant including the transmission indication information set at the predetermined value or the first control information set at the predetermined code point; and a unit that notifies the mobile station apparatus of the uplink grant including the indication of transmission of the sounding reference signal.

(12) According to the present invention, there is provided a mobile station apparatus that performs wireless communication with a base station apparatus. The mobile station apparatus at least includes: a unit that receives transmission control information notified from the base station apparatus; a unit that receives an uplink grant notified from the base station apparatus; and when receiving an indication of transmission of a sounding reference signal included in the uplink grant: a unit that transmits a first sounding reference signal to the base station apparatus, when the transmission of the first sounding reference signal is set by the transmission control information; and a unit that transmits a second sounding reference signal to the base station apparatus, when the transmission of the second sounding reference signal is set by the transmission control information.

(13) According to the present invention, there is provided a mobile station apparatus that performs wireless communication with a base station apparatus. The mobile station apparatus at least includes: a unit that receives an uplink grant notified from the base station apparatus; and a unit that transmits a first sounding reference signal or a second sounding reference signal to the base station apparatus, based on control information included in the uplink grant.

(14) According to the present invention, there is provided a mobile station apparatus that performs wireless communication with a base station apparatus. The mobile station apparatus at least includes: a unit that receives an uplink grant notified from the base station apparatus; a unit that transmits a first sounding reference signal to the base station apparatus, when transmission indication information included in the uplink grant is a first value; and a unit that transmits a second sounding reference signal to the base station apparatus, when the transmission indication information included in the uplink grant is a second value.

(15) According to the present invention, there is provided a mobile station apparatus that performs wireless communication with a base station apparatus. The mobile station apparatus at least includes: a unit that receives an uplink grant notified from the base station apparatus; a unit that transmits a first sounding reference signal to the base station apparatus, when transmission indication information included in the uplink grant indicates an indication of transmission of a sounding reference signal; and a unit that transmits a second sounding reference signal to the base station apparatus, when first control information included in the uplink grant is a predetermined code point.

(16) According to the present invention, there is provided a wireless communication method in which a base station apparatus and a mobile station apparatus perform wireless communication, the method comprising at least the steps of: in the base station apparatus, notifying the mobile station apparatus of transmission control information for setting, to the mobile station apparatus, whether to transmit a first sounding reference signal assigned in a physical uplink shared channel resource, or to transmit a second sounding reference signal assigned in a resource different from the physical uplink shared channel resource; and notifying the mobile station apparatus of an uplink grant including an indication of transmission of the sounding reference signal, and in the mobile station apparatus, when the indication of transmission of the sounding reference signal included in the uplink grant is received: transmitting the first sounding reference signal to the base station apparatus, when the transmission of the first sounding reference signal is set by the transmission control information; and transmitting the second sounding reference signal to the base station apparatus, when the transmission of the second sounding reference signal is set by the transmission control information.

(17) According to the present invention, there is provided a wireless communication method by which a base station apparatus and a mobile station apparatus perform wireless communication, the method comprising at least the steps of: in the base station apparatus, notifying the mobile station apparatus of an uplink grant including control information indicating whether to transmit a first sounding reference signal assigned in a physical uplink shared channel resource, or to transmit a second sounding reference signal assigned in a resource different from the physical uplink shared channel resource, and in the mobile station apparatus, transmitting the first sounding reference signal or the second sounding reference signal to the base station apparatus, based on the control information included in the uplink grant.

(18) According to the present invention, there is provided a wireless communication method by which a base station apparatus and a mobile station apparatus perform wireless communication, the method comprising at least the steps of: in the base station apparatus, setting transmission indication information included in an uplink grant as a first value, when the base station apparatus indicates the mobile station apparatus to perform transmission of a first sounding reference signal assigned in a physical uplink shared channel resource; setting the transmission indication information as a second value, when the base station apparatus indicates the mobile station apparatus to perform transmission of a second sounding reference signal assigned in a resource different from the physical uplink shared channel resource; and notifying the mobile station apparatus of the uplink grant including the transmission indication information set at the first value or the second value, and in the mobile station apparatus, transmitting the first sounding reference signal to the base station apparatus, when the transmission indication information included in the uplink grant is the first value; and transmitting the second sounding reference signal to the base station apparatus, when the transmission indication information included in the uplink grant is the second value.

(19) According to the present invention, there is provided a wireless communication method by which a base station apparatus and a mobile station apparatus perform wireless communication, the method comprising at least the steps of: in the base station apparatus, setting transmission indication information of one bit included in an uplink grant at a predetermined value, when the base station apparatus indicates the mobile station apparatus to perform transmission of a first sounding reference signal assigned in a physical uplink shared channel resource; setting first control information included in the uplink grant at a predetermined code point, when the base station apparatus indicates the mobile station apparatus to perform transmission of a second sounding reference signal assigned in a resource different from the physical uplink shared channel resource; setting the indication of transmission of the sounding reference signal with the transmission indication information or the first control information; notifying the mobile station apparatus of the uplink grant including the transmission indication information set at the predetermined value or the first control information set at the predetermined code point; and notifying the mobile station apparatus of the uplink grant including the indication of transmission of the sounding reference signal, and in the mobile station apparatus, transmitting the first sounding reference signal to the base station apparatus, when the transmission indication information included in the uplink grant indicates the indication of transmission of the sounding reference signal; and transmitting the second sounding reference signal to the base station apparatus, when the first control information included in the uplink grant is the predetermined code point.

(20) According to the present invention, there is provided an integrated circuit which, when mounted in a base station apparatus, causes the base station apparatus to perform a plurality of functions, the integrated circuit causing the base station apparatus to perform functions of: notifying a mobile station apparatus of transmission control information for setting, to the mobile station apparatus, whether to transmit a first sounding reference signal assigned in a physical uplink shared channel resource, or to transmit a second sounding reference signal assigned in a resource different from the physical uplink shared channel resource; and notifying the mobile station apparatus of an uplink grant including an indication of transmission of a sounding reference signal.

(21) According to the present invention, there is provided an integrated circuit which, when mounted in a base station apparatus, causes the base station apparatus to perform a plurality of functions, the integrated circuit causing the base station apparatus to perform a function of notifying a mobile station apparatus of an uplink grant including control information indicating whether to transmit a first sounding reference signal assigned in a physical uplink shared channel resource, or to transmit a second sounding reference signal assigned in a resource different from the physical uplink shared channel resource.

(22) According to the present invention, there is provided an integrated circuit which, when mounted in a base station apparatus, causes the base station apparatus to perform a plurality of functions, the integrated circuit causing the base station apparatus to perform functions of: setting transmission indication information included in an uplink grant as a first value, when indicating a mobile station apparatus to perform transmission of a first sounding reference signal assigned in a physical uplink shared channel resource; setting the transmission indication information as a second value, when indicating the mobile station apparatus to perform transmission of a second sounding reference signal assigned in a resource different from the physical uplink shared channel resource; and notifying the mobile station apparatus of the uplink grant including the transmission indication information set at the first value or the second value.

(23) According to the present invention, there is provided an integrated circuit which, when mounted in a base station apparatus, causes the base station apparatus to perform a plurality of functions, the integrated circuit causing the base station apparatus to perform functions of: setting transmission indication information of one bit included in an uplink grant at a predetermined value, when indicating a mobile station apparatus to perform transmission of a first sounding reference signal assigned in a physical uplink shared channel resource; setting first control information included in the uplink grant at a predetermined code point, when indicating the mobile station apparatus to perform transmission of a second sounding reference signal assigned in a resource different from the physical uplink shared channel resource; setting the indication of transmission of the sounding reference signal with the transmission indication information or the first control information; notifying the mobile station apparatus of the uplink grant including the transmission indication information set at the predetermined value or the first control information set at the predetermined code point; and notifying the mobile station apparatus of the uplink grant including the indication of transmission of the sounding reference signal.

(24) According to the present invention, there is provided an integrated circuit which, when mounted in a base station apparatus, causes a mobile station apparatus to perform a plurality of functions, the integrated circuit causing the mobile station apparatus to perform functions of: receiving transmission control information notified from abase station apparatus; receiving an uplink grant notified from the base station apparatus; and when an indication of transmission of a sounding reference signal included in the uplink grant is received: transmitting a first sounding reference signal to the base station apparatus, when the transmission of the first sounding reference signal is set by the transmission control information; and transmitting a second sounding reference signal to the base station apparatus, when the transmission of the second sounding reference signal is set by the transmission control information.

(25) According to the present invention, there is provided an integrated circuit which, when mounted in a base station apparatus, causes a mobile station apparatus to perform a plurality of functions, the integrated circuit causing the mobile station apparatus to perform functions of: receiving an uplink grant notified from a base station apparatus; and transmitting a first sounding reference signal or a second sounding reference signal to the base station apparatus, based on control information included in the uplink grant.

(26) According to the present invention, there is provided an integrated circuit which, when mounted in a base station apparatus, causes a mobile station apparatus to perform a plurality of functions, the integrated circuit causing the mobile station apparatus to perform functions of: receiving an uplink grant notified from a base station apparatus; and transmitting a first sounding reference signal to the base station apparatus, when transmission indication information included in the uplink grant is a first value; and transmitting a second sounding reference signal to the base station apparatus, when the transmission indication information included in the uplink grant is a second value.

(27) According to the present invention, there is provided an integrated circuit which, when mounted in a base station apparatus, causes a mobile station apparatus to perform a plurality of functions, the integrated circuit causing the mobile station apparatus to perform functions of: receiving an uplink grant notified from a base station apparatus; transmitting a first sounding reference signal to the base station apparatus, when transmission indication information included in the uplink grant indicates an indication of transmission of a sounding reference signal; and transmitting a second sounding reference signal to the base station apparatus, when first control information included in the uplink grant is a predetermined code point.

(28) According to the present invention, there is provided a base station apparatus that performs wireless communication with a mobile station apparatus. The base station apparatus at least includes a base station side transmission unit that notifies the mobile station apparatus of: a radio resource control signal including transmission control information for setting, to the mobile station apparatus, whether to transmit a first sounding reference signal assigned in a physical uplink shared channel resource, or to transmit a second sounding reference signal assigned in a resource different from the physical uplink shared channel resource is transmitted; and an uplink grant including an indication of transmission of a sounding reference signal.

(29) According to the present invention, there is provided a base station apparatus that performs wireless communication with a mobile station apparatus. The base station apparatus at least includes a base station side transmission unit that notifies the mobile station apparatus of an uplink grant including control information indicating whether to transmit a first sounding reference signal assigned in a physical uplink shared channel resource, or to transmit a second sounding reference signal assigned in a resource different from the physical uplink shared channel resource.

(30) According to the present invention, there is provided a base station apparatus that performs wireless communication with a mobile station apparatus. The base station apparatus at least includes: a base station side scheduling unit that: sets transmission indication information included in an uplink grant as a first value, when indicating the mobile station apparatus to perform transmission of a first sounding reference signal assigned in a physical uplink shared channel resource; and sets the transmission indication information as a second value, when indicating the mobile station apparatus to perform transmission of a second sounding reference signal assigned in a resource different from the physical uplink shared channel resource; and a base station side transmission unit that notifies the mobile station apparatus of the uplink grant including the transmission indication information set at the first value or the second value.

(31) According to the present invention, there is provided a base station apparatus that performs wireless communication with a mobile station apparatus. The base station apparatus at least includes: a base station side scheduling unit that: sets transmission indication information of one bit included in an uplink grant at a predetermined value, when indicating the mobile station apparatus to perform transmission of a first sounding reference signal assigned in a physical uplink shared channel resource; sets first control information included in the uplink grant at a predetermined code point, when indicating the mobile station apparatus to perform transmission of a second sounding reference signal assigned in a resource different from the physical uplink shared channel resource; and sets the indication of transmission of the sounding reference signal with the transmission indication information or the first control information; and a base station side transmission unit that notifies the mobile station apparatus of: the uplink grant including the transmission indication information set at the predetermined value or the first control information set at the predetermined code point; and the uplink grant including the indication of transmission of the sounding reference signal.

(32) According to the present invention, there is provided a mobile station apparatus that performs wireless communication with a base station apparatus. The mobile station apparatus at least includes: a mobile station side reception unit that receives transmission control information and an uplink grant notified from the base station apparatus; and a mobile station side transmission unit that, when receiving an indication of transmission of a sounding reference signal included in the uplink grant: transmits a first sounding reference signal to the base station apparatus, when transmission of the first sounding reference signal is set by the transmission control information; and transmits a second sounding reference signal to the base station apparatus, when transmission of the second sounding reference signal is set by the transmission control information.

(33) According to the present invention, there is provided a mobile station apparatus that performs wireless communication with a base station apparatus. The mobile station apparatus at least includes: a mobile station side reception unit that receives an uplink grant notified from the base station apparatus; and a mobile station side transmission unit that transmits a first sounding reference signal or a second sounding reference signal to the base station apparatus, based on control information included in the uplink grant.

(34) According to the present invention, there is provided a mobile station apparatus that performs wireless communication with a base station apparatus. The mobile station apparatus at least includes: a mobile station side reception unit that receives an uplink grant notified from the base station apparatus; and a mobile station side transmission unit that: transmits a first sounding reference signal to the base station apparatus, when transmission indication information included in the uplink grant is a first value; and transmits a second sounding reference signal to the base station apparatus, when the transmission indication information included in the uplink grant is a second value.

(35) According to the present invention, there is provided a mobile station apparatus that performs wireless communication with a base station apparatus. The mobile station apparatus at least includes: a mobile station side reception unit that receives an uplink grant notified from the base station apparatus; and a mobile station side transmission unit that: transmits a first sounding reference signal to the base station apparatus, when transmission indication information included in the uplink grant indicates an indication of transmission of a sounding reference signal; and transmits a second sounding reference signal to the base station apparatus, when first control information included in the uplink grant is a predetermined code point.

Advantages of the Invention

According to the present invention, it is possible to provide a mobile station apparatus, a base station apparatus, a wireless communication system, a wireless communication method, and an integrated circuit that can perform effective communication between the base station apparatus and the mobile station apparatus based on an A-SRS transmitted from the mobile station apparatus.

BEST MODES FOR CARRYING OUT THE INVENTION

Figure 1:
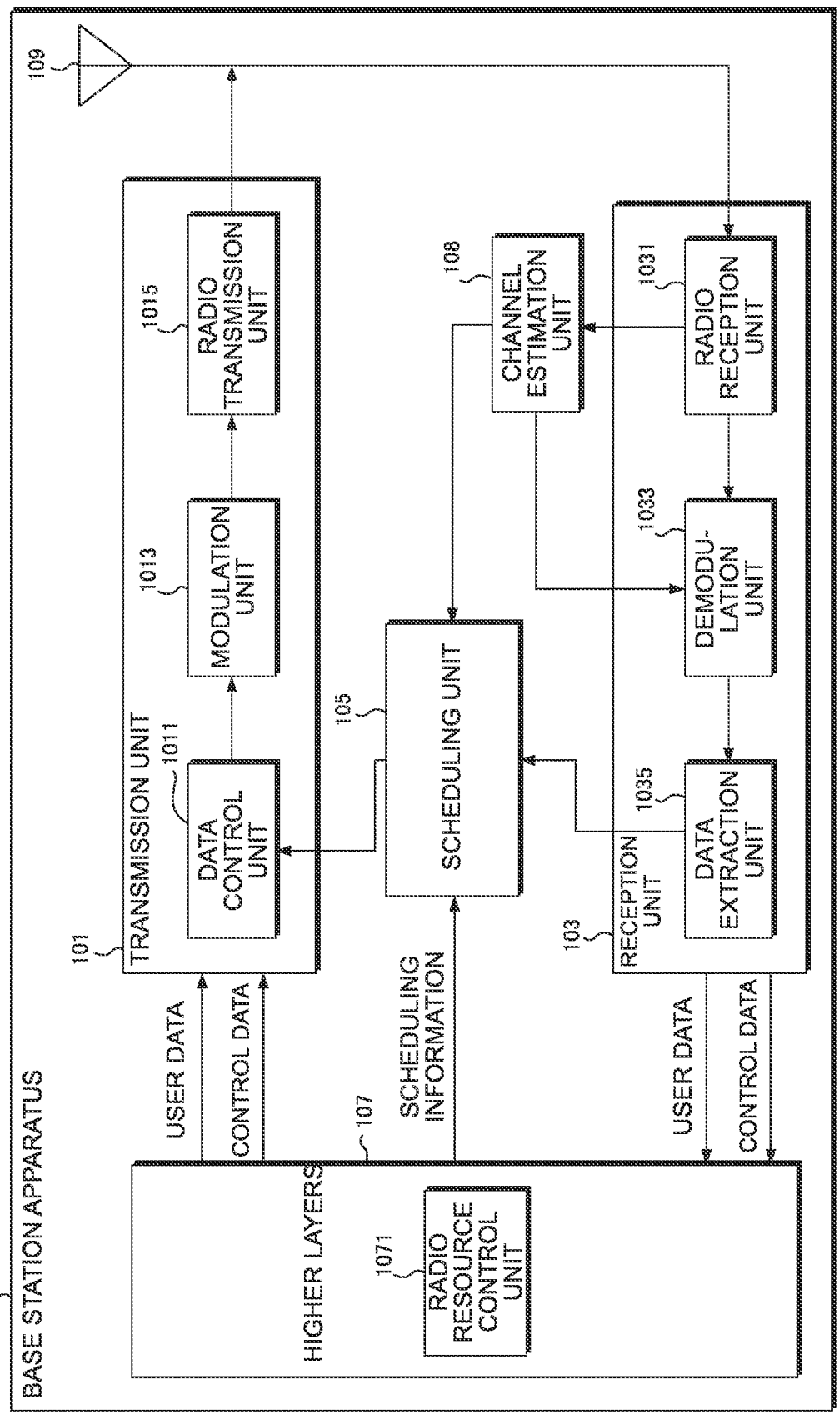
FIG. 1 is a block diagram showing a schematic functional structure of a base station apparatus 1 of the present invention.

Before the specific description of embodiments of the present invention is given, outlines of communication techniques used in the present invention will be briefly described.

(Physical Channel)

The physical channels used in the present invention include a physical broadcast channel (PBCH), a physical downlink shared channel (PDSCH), a physical downlink control channel (PDCCH), a downlink reference signal (DL-RS or Cell-specific Reference Signal), a physical uplink shared channel (PUSCH), a physical uplink control channel (PUCCH), a physical random access channel (PRACH), an uplink reference signal (UL-RS), and the like. Even if different kinds of physical channels are added, they are applicable to the embodiments of the present invention described below.

The physical broadcast channel is transmitted for the purpose of notifying a control parameter (broadcast information) commonly used for mobile station apparatuses in a cell. Broadcast information which is not notified by a PBCH and a resource for which is notified by a PDCCH, is transmitted by using a physical uplink shared channel. A cell global ID (Identity) or the like indicating a cell individual ID, is notified as broadcast information. A broadcast channel (BCH) is mapped to a PBCH at 40 ms intervals. The 40 ms timing is blindly detected (blind detection) in the mobile station apparatus. That is, for PBCH timing presentation, explicit signaling is not transmitted to the mobile station apparatus. Furthermore, a subframe including a PBCH can be decoded only by the subframe (is self-decodable).

The physical downlink control channel is a downlink channel transmitted from a base station apparatus to the mobile station apparatus, and is a channel used to notify the mobile station apparatus of downlink control information (DCI) such as: a downlink assignment including PDSCH resource allocation, and hybrid automatic repeat request (HARQ) information for downlink data (DL-SCH: Downlink-Shared Channel); and uplink transmission permission (an uplink grant) that is the resource allocation of a physical uplink shared channel (PUSCH), and HARQ information for uplink data (UL-SCH: Uplink Shared Channel). Furthermore, the PDCCH includes a plurality of control channel elements (CCEs), and the mobile station apparatus receives a PDCCH from the base station apparatus by detecting the PDCCH including CCEs. This CCE includes a plurality of resource element groups (also referred to as REGs or mini-CCEs) dispersed in the time domain and the frequency domain. Here, the resource element is a unit resource composed of one OFDM symbol (time domain) and one subcarrier (frequency domain).

A plurality of formats is prepared for downlink control information transmitted by a physical downlink control channel. The format of downlink control information (DCI) is referred to as a DCI Format. For example, DCI format 0 used when the mobile station apparatus 3 transmits a PUSCH by one transmission antenna port, DCI format 0A used when the mobile station apparatus 3 transmits a PUSCH by spatial multiplexing (SM) utilizing MIMO (Multiple Input Multiple Output), and the like are prepared as the DCI formats of an uplink grant.

Furthermore, DCI format 1 used when the base station apparatus transmits a PDSCH by using one transmission antenna port or by using a transmission diversity scheme by a plurality of transmission antenna ports, DCI format 1A having the smaller number of bits than DCI format 1, DCI format 1C used for the radio resource allocation of paging information, or the like and having the further smaller number of bits than DCI format 1A, DCI format 2 used when the mobile station apparatus transmits a PDSCH by SM utilizing MIMO, and the like are prepared as the DCI formats of downlink assignments. In DCI format 0 and DCI format 1A, the sizes of these two DCI formats are made the same by inserting bits into the DCI format having the smaller number of bits, and a flag (Flag for format 0/format 1A differentiation) for identifying the format is included therein.

Specifically, DCI format 0 that is an uplink grant includes control information (also referred to as a field, a control information field, an information field, and a bit field) such as PDCCH format identification (Flag for format 0/format 1A differentiation) information, a frequency hopping flag, resource block assignment and hopping resource allocation information, modulation and coding scheme and redundancy version information, NDI (New Data Indicator) information, information of a transmission power control (TPC) command for a scheduled PUSCH, information of a cyclic shift for a DM-RS, CQI transmission indication (CQI request) information, padding bit (0 padding) information, and cyclic redundancy check (CRC) information.

The PDCCH format identification information is information indicating the kind of DCI format of this downlink control information, i.e., whether the DCI format is DCI format 0 or DCI format 1A. The resource block assignment and hopping resource allocation information is information indicating a PUSCH resource block assignment and resource allocation in the case where hopping is performed. The modulation and coding scheme and redundancy version information is information indicating a modulation scheme, coding rate, and redundancy version of a PUSCH. The NDI information is information indicating whether the PUSCH is initially transmitted or retransmitted. The information of a transmission power control command for a PUSCH is information used for the transmission power control of the PUSCH. The information of a cyclic shift for a DM-RS is information indicating a cyclic shift for a DM-RS. The padding bit (0 padding) information is a bit inserted so that the sizes of DCI format 0 and DCI format 1A are made the same, and the value of the bit is set at "0". When the base station apparatus requests a CQI, the CQI transmission indication information can indicate the mobile station apparatus: to assign the CQI by utilizing a PUSCH resource; and to dynamically transmit it to the base station apparatus. The CQI at this time is also referred to as an aperiodic CQI (A-CQI).

Specifically, DCI format 1A that is a downlink assignment includes control information (also referred to as a field, a control information field, an information field, and a bit field) such as PDCCH format identification (Flag for format 0/format 1A differentiation) information, information of localized/distributed VRB assignment flag of virtual resource blocks (VRBs), resource block assignment information, modulation and coding scheme (MCS) information, HARQ process number information, NDI (New Data Indicator) information, redundancy version (RV) information, information of a transmission power control (TPC) command for a PUCCH, padding bit (0 padding) information, and cyclic redundancy check (CRC) information.

The PDCCH format identification information is information indicating the kind of DCI format of this downlink control information, i.e., whether the DCI format is DCI format 0 or DCI format 1A. The information of localized/distributed VRB assignment flag is information indicating a method for associating virtual resource blocks indicated by resource block assignment information with actual resource blocks (localized assignment or distributed assignment). The resource block assignment information is information indicating virtual resource blocks allocated to a PDSCH. The modulation and coding scheme information is information related to a modulation scheme and coding rate of the PDSCH, and the amount of downlink data transmitted by the PDSCH. The HARQ process number information is information indicating which number of HARQ process downlink data transmitted by the PDSCH to which DCI format 1A corresponds to. The NDI information is information indicating whether the PDSCH is initially transmitted or retransmitted. The redundancy version information is information indicating which part of a bit sequence in which the downlink data is coded is transmitted. The transmission power control command for a PUCCH is information used for the transmission power control of the PUCCH. The padding bit (0 padding) information is a bit inserted so that the sizes of DCI format 0 and DCI format 1A are made the same, and the value of the bit is set at "0".

Since a DCI format used for group scheduling for a plurality of mobile station apparatuses needs to be received by the plurality of mobile station apparatuses, the DCI format is assigned in a common search space (CSS). The CSS is a search space in which all the mobile station apparatuses try to search (detect) a PDCCH. Here, a PDCCH addressed to a certain mobile station apparatus is assigned in a user equipment specific search space (USS) and a common search space (CSS). The USS is a search space in which the certain mobile station apparatus tries to search (detect) the PDCCH.

The base station apparatus assigns a sequence in which a CRC code generated based on a DCI is scrambled by an RNTI (Radio Network Temporary Identifier) to the DCI, and transmits the resultant to the mobile station apparatus. The mobile station apparatus changes the interpretation of a DCI in accordance with by what RNTI a CRC code is scrambled. For example, the mobile station apparatus determines that a DCI is a DCI addressed to its own apparatus, when a CRC code is scrambled by a C-RNTI (Cell-RNTI) or an SPS (Semi Persistent Scheduling) C-RNTI allocated from the base station apparatus.

PDCCHs are separately coded (separate coding) for each mobile station apparatus or for each type. That is, the mobile station apparatus detects the plurality of PDCCHs, and obtains downlink resource allocation, uplink resource allocation, and the other control information. The value of a CRC scrambled by an RNTI is assigned to each PDCCH, and the mobile station apparatus performs descrambling (release of scrambling) of the CRC scrambled by the RNTI on the corresponding set of CCEs that may constitute each PDCCH, and obtains the value of the CRC. Then, the mobile station apparatus performs CRC by using the value of the obtained CRC, and obtains a PDCCH succeeding in the CRC as a PDCCH for its own apparatus. When the descrambling of the CRC scrambled by an RNTI allocated to another apparatus is performed by using an RNTI allocated to its own apparatus, since it is impossible to obtain the value of a correct CRC, recognition as a PDCCH addressed to its own apparatus is not performed. This is also referred to as blind detection, and the range of the set of CCEs on which the mobile station apparatus may perform blind detection is referred to as a search space. That is, the mobile station apparatus performs blind detection on CCEs in a search space, and detects a PDCCH addressed to its own apparatus.

The physical downlink shared channel is a channel used to transmit downlink data (also referred to as DL-SCH: Downlink-Shared Channel), or paging information.

The downlink reference signal is transmitted from the base station apparatus to the mobile station apparatus by utilizing a downlink. The mobile station apparatus measures a downlink reference signal, and thus, determines the reception quality of the downlink. Reception quality is notified to the base station apparatus by using a PUCCH or a PUSCH as a channel quality indicator (CQI) that is a quality information indicator. The base station apparatus performs downlink transmission scheduling for the mobile station apparatus based on a CQI notified from the mobile station apparatus. As reception quality, it is possible to use signal-to-interference ratio (SIR), signal-to-interference plus noise ratio (SINR), signal-to-noise ratio (SNR), carrier-to-interference ratio (CIR), block error rate, (BLER), pathloss (PL), or the like.

The physical uplink shared channel is a channel used to mainly transmit uplink data (UL-SCH: Uplink-Shared Channel). When the base station apparatus performs scheduling for the mobile station apparatus, channel state information (a downlink channel quality indicator (CQI), a precoding matrix indicator (PMI), and a rank indicator (RI)), and HARQ acknowledgement (ACK)/negative acknowledgement (NACK) for downlink transmission are also transmitted by using a PUSCH. Here, the uplink data (UL-SCH) represents, for example, the transmission of user data, and the UL-SCH is a transport channel. The UL-SCH supports HARQ and dynamic adaptive radio link control, and furthermore, enables beam forming to be utilized. The UL-SCH supports dynamic resource allocation and semi-static resource allocation.

The physical uplink control channel is a channel used to transmit uplink control information (UCI). Here, the UCI (also referred to as control data) includes, for example, channel state information (a CQI, PMI, and RI) transmitted (fed back) from the mobile station apparatus to the base station apparatus, scheduling request (SR) that requests (requests transmission on an UL-SCH) resource allocation for the mobile station apparatus to transmit uplink data, HARQ ACK/NACK for downlink transmission, and the like.

The uplink reference signal is transmitted from the mobile station apparatus to the base station apparatus. The UL-RS includes a sounding reference signal (SRS) and a demodulation reference signal (DM-RS). The SRS that is a reference signal for channel estimation is measured by the base station apparatus and thus is used for determining the reception quality of an uplink radio transmission signal of the mobile station apparatus and for the scheduling of the uplink or the adjustment of uplink timing synchronization based on reception quality. Furthermore, the DM-RS is transmitted together with a PUSCH or a PUCCH, and is used also as a reference signal for: calculating the change amount of the amplitude, phase, and frequency of the signal of the PUSCH or the PUCCH; and demodulating the signal transmitted by utilizing the PUSCH or the PUCCH.

Although the transmission bandwidth of the DM-RS accords with the transmission bandwidth of the PUSCH or the PUCCH, the transmission bandwidth of the SRS is set independently from that of the DM-RS. That is, the transmission bandwidth of the SRS does not necessarily accord with the transmission bandwidth of the PUSCH or the PUCCH, and is preset by the base station apparatus. Furthermore, frequency hopping is applied to the SRS for the time axis direction. In the SRS, a frequency diversity effect and an averaging effect of interference are obtained by using frequency hopping. Furthermore, in the SRS, the distribution assignment (also referred to as Transmission Comb) of radio resources is performed in the frequency axis direction. For example, radio resources can be assigned at every second subcarrier in the frequency axis direction, and a plurality of mobile station apparatuses can perform frequency division multiple access (FDMA) of SRSs at the same transmission timing by changing the position of combs (for example, a comb 0 and a comb 1) to perform assignment. Such FDMA is also referred as interleaved frequency division multiple access (IFDMA).

The A-SRS is a reference signal for channel estimation transmitted when the base station apparatus requests transmission of A-SRS for a certain mobile station apparatus. And a subframe for transmitting an A-SRS may be set by using a PDCCH. Or a subframe for transmitting an A-SRS may be set by using a radio resource control signal, by the base station apparatus. Furthermore, the subframe for transmitting an A-SRS may be set by using a broadcast channel by the base station apparatus. Here, the radio resource control signal is transmitted at about 100 ms to 200 ms intervals, for example.

Furthermore, the P-SRS is a reference signal for channel estimation transmitted in accordance with a transmission period that the base station apparatus presets, and a subframe for transmitting a P-SRS may be set by using a radio resource control signal, or may be set by using a broadcast channel, by the base station apparatus. Furthermore, setting information (SRS configuration) related to SRS parameters such as each transmission period and transmission bandwidth of the A-SRS and the P-SRS may be preset and included in a radio resource control signal in the base station apparatus, and thereafter, may be transmitted to the mobile station apparatus.

Furthermore, SRS subframes (respective subframes for transmitting an A-SRS and a P-SRS) that are subframes transmitting SRSs may be set for each cell or may be set for each mobile station apparatus. The subframes for transmitting an A-SRS and a P-SRS may be transmitted by using the same subframe or may be transmitted by using different subframes. For example, the base station apparatus may set a subframe for transmitting an A-SRS for each mobile station apparatus, or may set a subframe for transmitting a P-SRS for each cell. Here, the SRS subframe set for each cell is referred to as a cell-specific SRS subframe, and the SRS subframe set for each mobile station apparatus is referred to as a mobile station apparatus-specific SRS subframe. Furthermore, as a different example, the base station apparatus may set a subframe for transmitting a P-SRS for each cell, and may set a part of the subframe for transmitting a P-SRS as a subframe for transmitting an A-SRS for each cell or for each mobile station apparatus.

Furthermore, in A-SRSs, there are an inband A-SRS assigned by utilizing a PUSCH resource and an outband A-SRS in which the parameters of a transmission bandwidth, and the like are set independently from the PUSCH (i.e., which is set by the SRS configuration information described above). The inband A-SRS is also referred to as a first A-SRS, and when an indication of transmission of the first A-SRS is included in an uplink grant, the inband A-SRS is transmitted to the base station apparatus always together with a PUSCH. That is, the first A-SRS is always transmitted on the same subframe as the PUSCH. The first A-SRS can improve communication properties in a cell edge, or the like in which communication environment is poor.

That is, the base station apparatus transmits resource allocation information for a PUSCH and an uplink grant including an indication of transmission of the first A-SRS to the mobile station apparatus, and the mobile station apparatus assigns the first A-SRS in a PUSCH resource allocated by the base station apparatus and transmits the first A-SRS to the base station apparatus.

The outband A-SRS is also referred to as a second A-SRS, the parameters of a transmission bandwidth, and the like are set independently from the PUSCH as in the P-SRS, and the outband A-SRS does not necessarily need to be transmitted to the base station apparatus together with a PUSCH. Since the second A-SRS can be transmitted independently from the PUSCH, the second A-SRS can be assigned in a frequency band different from a frequency band in which a PUSCH is assigned, and can be used for dynamic frequency selection scheduling.

That is, The base station apparatus sets, to the mobile station apparatus, parameters (for example, a transmission bandwidth, a resource, and the like) for the mobile station apparatus to transmit the second A-SRS. The base station apparatus transmits an uplink grant including an indication of transmission of the second A-SRS to the mobile station apparatus, and the mobile station apparatus assigns the second A-SRS in a resource set by the base station apparatus and transmits the second A-SRS to the base station apparatus. That is, the mobile station apparatus assigns the second A-SRS in a resource different from a PUSCH resource allocated by an uplink grant from the base station apparatus and transmits the second A-SRS to the base station apparatus. The base station apparatus sets, independently from a PUSCH resource, a resource to which the mobile station apparatus assigns the second A-SRS.

Figure 8:
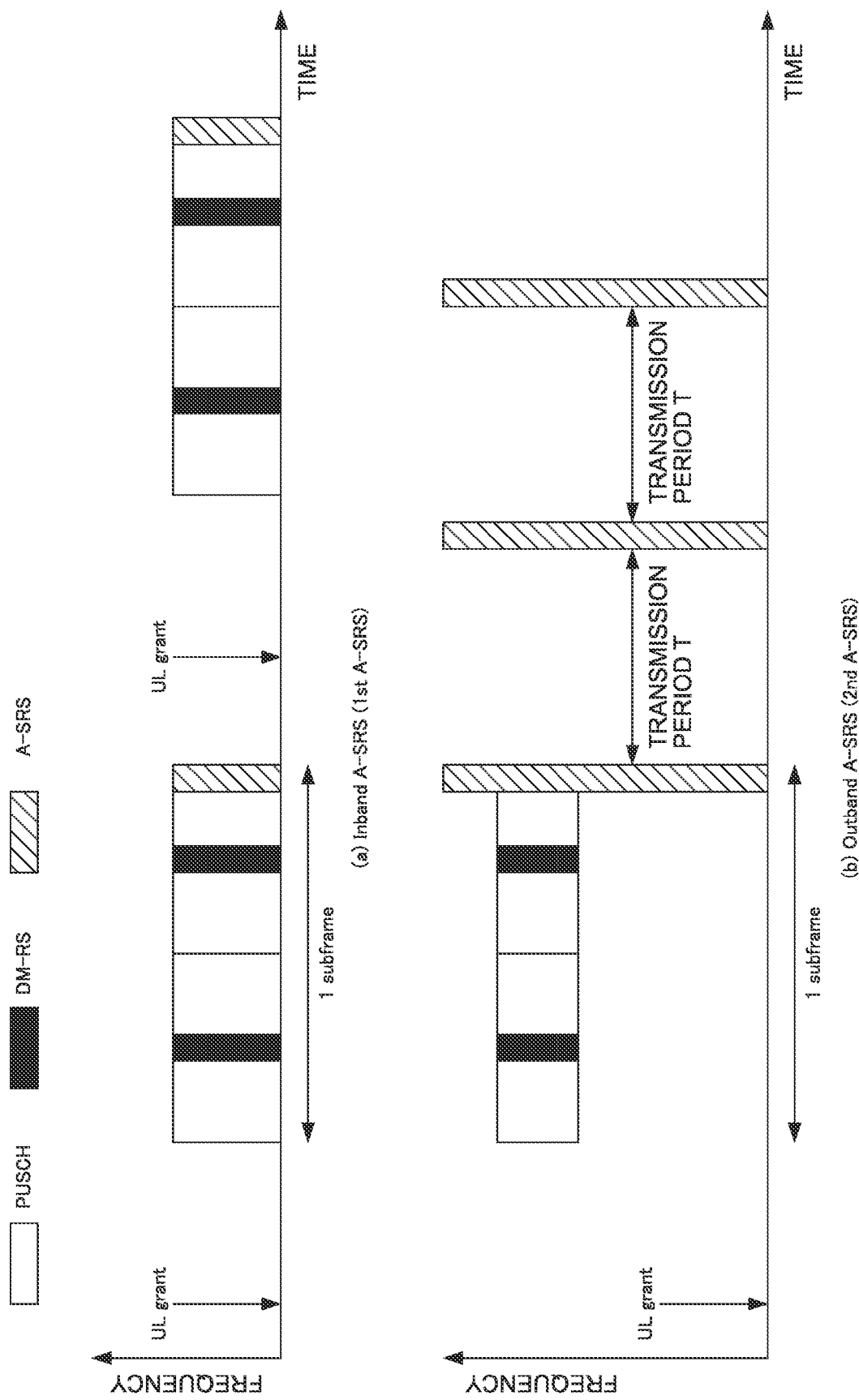
FIGS. 8(a) and 8(b) are views showing schematic structures of an inband A-SRS (a first A-SRS) and an outband A-SRS (a second A-SRS).

FIGS. 8(a) and 8(b) are views showing schematic configurations of an inband A-SRS (a first A-SRS) and an outband A-SRS (a second A-SRS). FIG. 8(a) shows a schematic structure of the first A-SRS. The first A-SRS is set at, for example, the same transmission bandwidth as a PUSCH and is included in a PUSCH resource. Furthermore, the first A-SRS is transmitted to the base station apparatus always together with a PUSCH. When the first A-SRS and a P-SRS are transmitted at the same timing, they may be set so as to be assigned in different combs in advance and to be transmitted at the same timing, and the first A-SRS may be transmitted at certain timing different from a P-SRS transmission timing. That is, since the symbol in which the first A-SRS is assigned does not necessarily need to be an SRS symbol, the symbol in which the first A-SRS is assigned may be any of symbols in which PUCCHs are assigned. Here, the symbol in which the first A-SRS is assigned may be uniquely predetermined in the system, may be notified from the base station apparatus to the mobile station apparatuses as broadcast information at a time, or may be notified from the base station apparatus to individual mobile station apparatuses.

FIG. 8(b) shows a schematic configuration of the second A-SRS. The second A-SRS is different from the first A-SRS, and parameters are set independently from the PUSCH. Therefore, it is possible to set a wide transmission bandwidth necessary to perform frequency selection scheduling. Furthermore, since the second A-SRS can be assigned independently from the PUSCH (in a different resource), the second A-SRS does not necessarily need to be transmitted by the same subframe as a PUSCH. That is, since the mobile station apparatus 3 may transmit the second A-SRS to the base station apparatus without the PUSCH (UL-SCH data), the base station apparatus can allocate, by scheduling, a PUSCH resource to another mobile station apparatus that does not transmit the second A-SRS, and spectrum efficiency can be improved in the entire system. When a P-SRS and the second A-SRS are transmitted at the same timing, the mobile station apparatus 3 may transmits the second A-SRS to the base station apparatus 1. Furthermore, when a P-SRS and the second A-SRS are transmitted at the same timing, the mobile station apparatus 3 may transmits the P-SRS to the base station apparatus 1. Furthermore, the mobile station apparatus 3 may be performed so that the P-SRS and the second A-SRS are transmitted at the same timing by setting different combs. Here, the same timing also means that transmission timing is the same symbol.

The physical random access channel is a physical channel used to transmit a random access preamble, and has a guard time. It is the biggest goal of the PRACH that the mobile station apparatus is synchronized with the base station apparatus, and in addition to that, the PRACH is used for an initial access, a handover, a reconnection request, and a scheduling request.

The scheduling request is information for the mobile station apparatus to request PUSCH resource allocation from the base station apparatus. The mobile station apparatus, when information data transmitted to a buffer of its own apparatus is accumulated and PUSCH resource allocation is requested, transmits an SR. Furthermore, the mobile station apparatus transmits an SR to the base station apparatus by using a PUCCH allocated in advance by the base station apparatus. The base station apparatus allocates periodic resources for the mobile station apparatus to assign an SR, at the start of communication connection with the mobile station apparatus.

(SRS Resource Allocation and Frequency Hopping)

Figure 9:
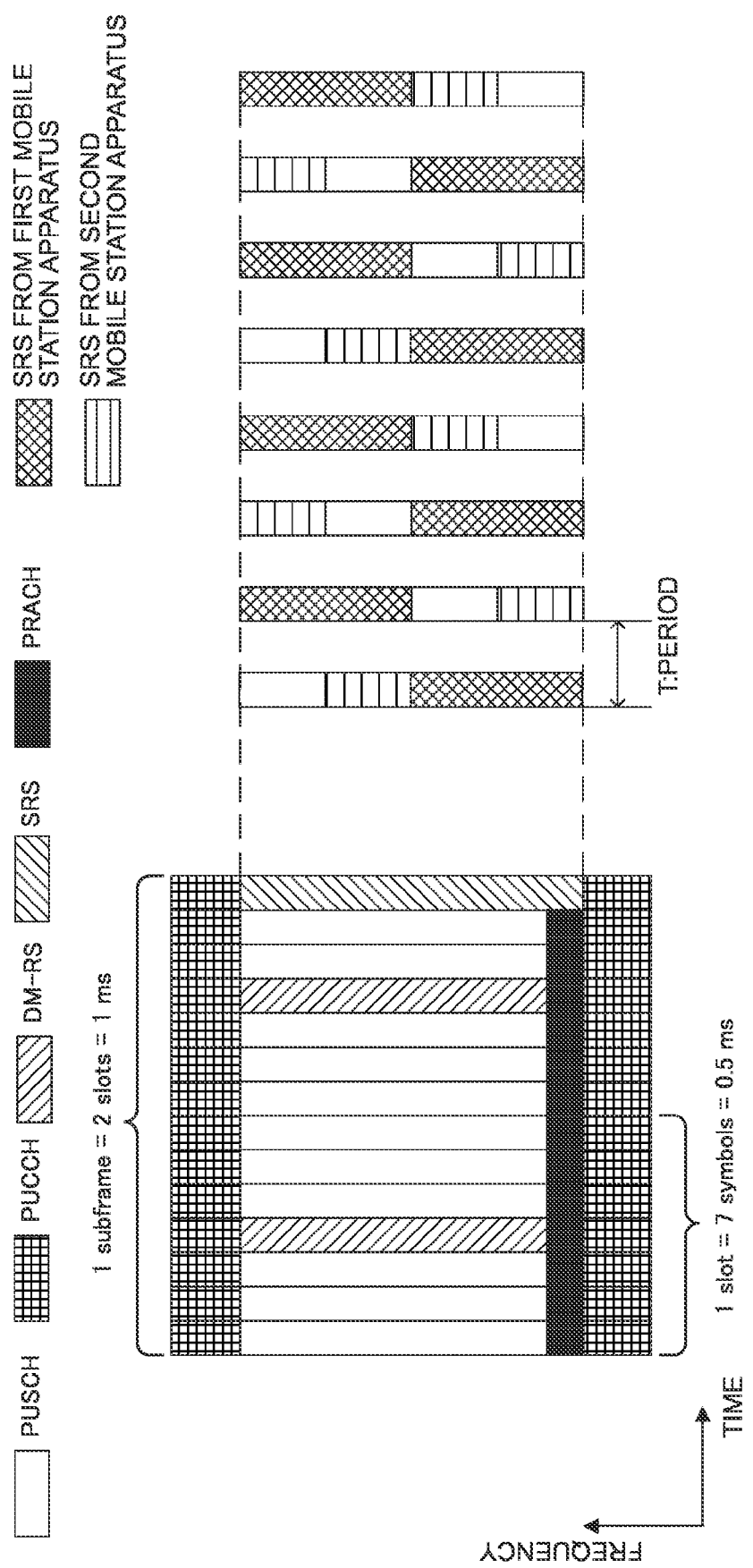
FIG. 9 is a view showing schematic structures of SRS resource allocation and frequency hopping (FH).

FIG. 9 is a view showing a schematic structure of SRS resource allocation and frequency hopping (FH). In FIG. 9, the horizontal axis represents time and the vertical axis represents frequency. The left side in FIG. 9 shows an example of SRS resource allocation. In the example on the left side in FIG. 9, 14 symbols are arrayed in the time axis direction. 7 symbols correspond to one slot, and the length of one slot is 0.5 milliseconds (ms). Furthermore, 14 symbols (that correspond to two slots) correspond to one subframe, and the length of one subframe is 1 millisecond (ms). In this way, in an uplink signal in which one subframe is composed of 14 symbols, an SRS is assigned in the fourteenth symbol (also referred to as an SRS symbol). The SRS resource assigned in the fourteenth symbol (the bandwidth in the frequency axis direction) is set in the base station apparatus in accordance with an uplink system bandwidth or the transmission power of the mobile station apparatus. Furthermore, the PRACH can change and allocate the bandwidth and the time symbol length in accordance with the kind of message to transmit or a format. When one subframe is composed of 14 symbols, DM-RSs are assigned in the fourth and eleventh symbols (also referred to as DM-RS symbols), and the transmission bandwidth of the DM-RS accords with the transmission bandwidth of a PUSCH.

Furthermore, frequency hopping that changes frequency position for each transmission is applied in the time axis direction. The right side in FIG. 9 shows one example of SRS frequency hopping. Although an SRS is transmitted for each transmission period T on the right side in FIG. 9, hopping is performed in the frequency axis direction for each period T (i.e., for each SRS transmission) as shown in FIG. 9. When a hopping bandwidth that is one piece of SRS configuration information is set at a bandwidth wider than an SRS transmission bandwidth, the mobile station apparatus can apply frequency hopping.

[Structure of a Base Station Apparatus]

FIG. 1 is a block diagram showing a schematic functional structure of a base station apparatus 1 of the present invention. The base station apparatus 1 includes a transmission unit 101, a reception unit 103, a scheduling unit (base station side scheduling unit) 105, a higher layers 107, a channel estimation unit 108, and an antenna 109. The transmission unit 101 includes a data control unit 1011, a modulation unit 1013, and a radio transmission unit 1015. Furthermore, the transmission unit 103 includes a radio reception unit 1031, a demodulation unit 1033, and a data extraction unit 1035.

The data control unit 1011 allows user data and control data to be input, assigns the control data to a PDCCH by an indication from the scheduling unit 105, and assigns transmission data and the control data for a mobile station apparatus 3 to a PDSCH. The modulation unit 1013 performs signal processing such as data modulation, serial/parallel transform of an input signal, IFFT, CP insertion, filtering, and the like, and generates a transmission signal. The radio unit 1015, after up-converting modulated data into a radio frequency, transmits the resultant to the mobile station apparatus 3 via the antenna 109. Furthermore, the transmission unit 101 causes first to third control information to be included in the PDCCH by an indication of the scheduling unit 105, and transmits the PDCCH to the mobile station apparatus 3.

The radio reception unit 1031 receives an uplink signal from the mobile station apparatus 3, down-converts the uplink signal into a baseband signal, and outputs the received data to the demodulation unit 1033. The data extraction unit 1035 checks the accuracy of the received data and notifies the scheduling unit 105 of the check result. When the received data is correct, the data extraction unit 1035 separates the received data into user data and control data. The data extraction unit 1035 outputs Layer 2 control data such as downlink channel quality indication information, acknowledgement/negative acknowledgement (ACK/NACK) of downlink data, and the like, of the control data to the scheduling unit 105, and outputs other control data of Layer 3 and the like and user data, to the higher layers 107. When the received data is incorrect, the data extraction unit 1035 saves the received data in order to synthesize the received data with data to be retransmitted, and performs synthesis processing when the data to be retransmitted is received.

The scheduling unit 105 performs scheduling for assigning user data and control data in a PDSCH and a PDCCH. Furthermore, the scheduling unit 105 indicates the transmission unit 101 to transmit the PDCCH (DCI format) including an indication of transmission of an A-SRS by an indication from the higher layers 107.

The higher layers 107 performs processing of a medium access control (MAC) layer, a radio link control (RLC) layer, a packet data convergence protocol (PDCP) layer, and a radio resource control (RRC) layer. Since the higher layers 107 controls processing units of the lower layer integrally, interfaces between: the higher layers 107; and the scheduling unit 105, the channel estimation unit 108, the antenna 109, the transmission unit 101, and the reception unit 103 are present.

The higher layers 107 has a radio resource control unit 1071 (also referred to as a control unit). Furthermore, the radio resource control unit 1071 performs management of various types of setting information, management of system information, paging control, management of a communication state of each mobile station apparatus, mobility management of a handover and the like, management of a buffer situation for each mobile station apparatus, management of connection setting of unicast and multicast bearers, management of a mobile station identifier (also referred to as a UEID, or an RNTI (Radio Network Temporary Identifier)), and the like. Furthermore, the higher layers 107 performs transmission/reception of information to/from another base station apparatus 1 and to/from an higher node. Furthermore, the higher layers 107 performs setting and management of parameters such as the transmission bandwidth of an SRS, and the like as SRS configuration information, and indicates the scheduling unit 105 to notify the mobile station apparatus 3 of a radio resource control signal including SRS configuration information. Furthermore, the SRS configuration information may include not only a P-SRS parameter, but also A-SRS (each of the first A-SRS and the second A-SRS) parameters to be notified. Furthermore, when the higher layers 107, if necessary, wants to perform uplink channel estimation, the higher layers 107 indicates the scheduling unit 105 on the transmission of an A-SRS. Furthermore, the higher layers 107 determines the communication environment of the mobile station apparatus 3 based on the channel estimation value of an uplink signal obtained by the channel estimation unit 108, and performs optimal PUSCH resource allocation. Furthermore, in view of the communication environment of the mobile station apparatus 3, the higher layers 107 can indicate the mobile station apparatus 3 to perform optimal A-SRS transmission. In order to indicate the mobile station apparatus 3 to perform transmission switching of the first A-SRS utilizing a PUSCH resource and the second A-SRS in which parameters and the like are set independently from a PUSCH, scheduling information including information for performing indication of the transmission switching of the first A-SRS and the second A-SRS is output to the scheduling unit 105.

Furthermore, in uplink scheduling, the scheduling unit 105 generates scheduling information used in: processing of selecting an uplink transport format (a transmission format, i.e., physical resource block allocation, a modulation scheme, a coding scheme, and the like) for modulating each data piece; and the uplink scheduling, based on: an estimation result of an uplink channel state (radio channel state) that the channel estimation unit 108 outputs; a resource allocation request from the mobile station apparatus 3; available PRB information of the mobile station apparatus 3; scheduling information input from the higher layers 107; and the like. This scheduling information used in the uplink scheduling is output to the data control unit 1011. Furthermore, when an indication of transmission of the first or second A-SRS is performed from the higher layers 107, the scheduling information is reset, and the resultant is output to the data control unit 1011.

Furthermore, the scheduling unit 105 maps a logical channel of the downlink input from the higher layers 107 to a transport channel, and outputs the resultant to the data control unit 1011. Furthermore, after the scheduling unit 105, if necessary, processes control data and a transport channel obtained in the uplink that are input from the data extraction unit 1035, the scheduling unit 105 maps the resultant to a logical channel of the uplink, and outputs the resultant to the higher layers 107.

The channel estimation unit 108 estimates an uplink channel state from a demodulation reference signal for demodulation of uplink data, and outputs the estimation result to the demodulation unit 1033. Furthermore, in order to perform uplink scheduling, the channel estimation unit 108 estimates an uplink channel state from a sounding reference signal, and outputs the estimation result to the demodulation unit 105.

[Structure of a Mobile Station Apparatus]

Figure 2:
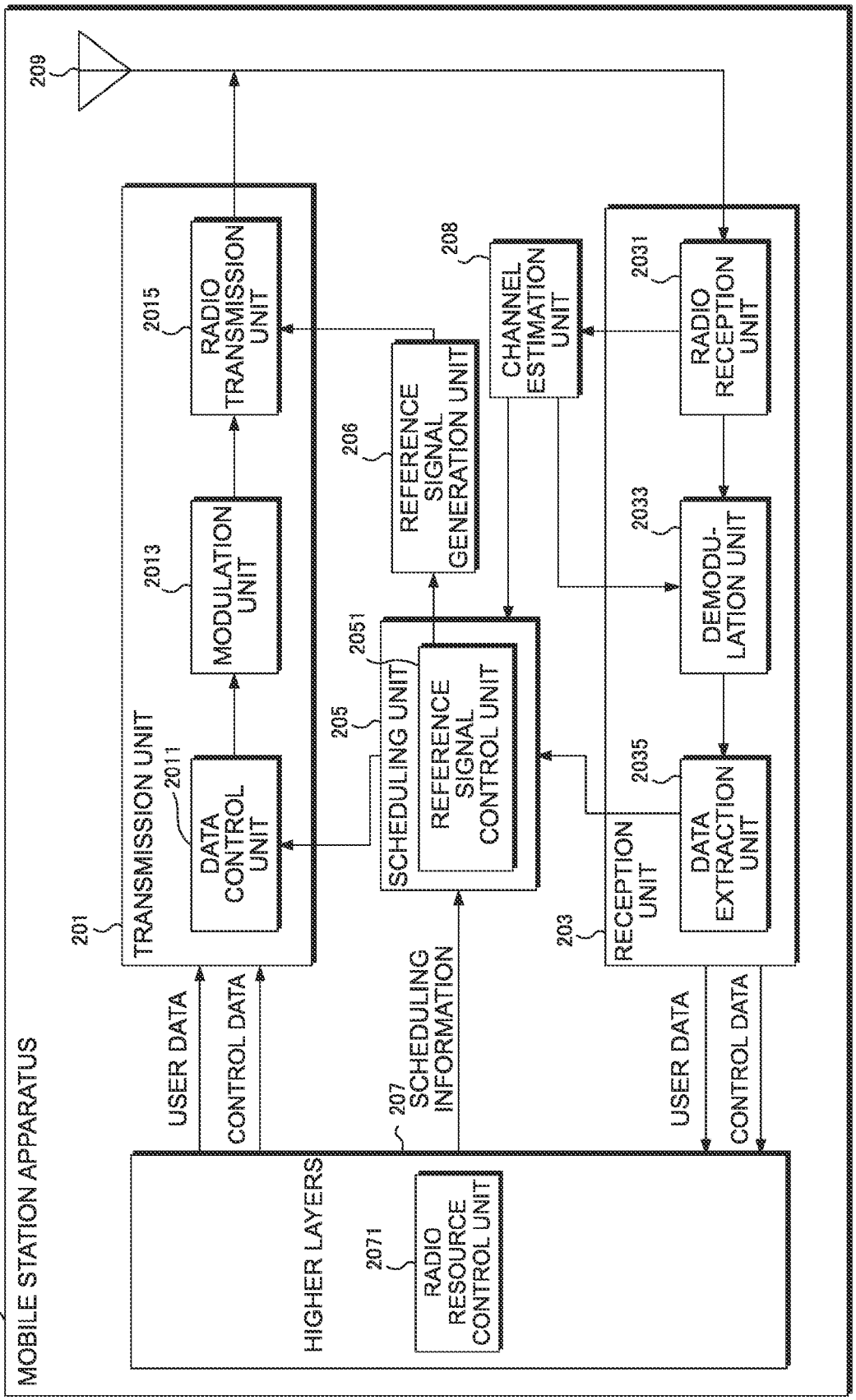
FIG. 2 is a block diagram showing a schematic functional structure of a mobile station apparatus 3 of the present invention.

FIG. 2 is a block diagram showing a schematic functional configuration of a mobile station apparatus 3 of the present invention. The base station apparatus 3 includes a transmission unit 201, a reception unit 203, a scheduling unit 205, a reference signal generation unit 206, higher layers 207, and an antenna 209. The transmission unit 201 includes a data control unit 2011, a modulation unit 2013, and a radio transmission unit 2015. Furthermore, the transmission unit 203 includes a radio reception unit 2031, a demodulation unit 2033, and a data extraction unit 2035.

User data and control data are input from the higher layers 207 to the data control unit 2011. The data control unit 2011 assigns the input data in a PUSCH and a PUCCH by an indication from the scheduling unit 205. The modulation unit 2013 performs data modulation of the PUSCH and the PUCCH, and outputs the resultant to the radio transmission unit 2015. The radio transmission unit 2015: performs signal processing such as discrete Fourier transform (DFT), subcarrier mapping, inverse fast Fourier transform (IFFT), cyclic prefix (CP) insertion, and filtering, on the modulated data; generates a transmission signal; up-converts the transmission signal into a radio frequency; and thereafter, transmits the resultant to the base station apparatus 1 via the antenna 209.

The radio reception unit 2031 receives a downlink signal from the base station apparatus 1, down-converts the downlink signal into a baseband signal, and outputs the received signal to the demodulation unit 2033. The demodulation unit 2033 demodulated received data. The data extraction unit 2035 separates the received data into user data and control data. Furthermore, the data extraction unit 2035 outputs scheduling information, random access response message, the control data related to discontinuous reception control, and other 2 Layer control data to the scheduling unit 205, and outputs the user data to the higher layers 207. Furthermore, the data extraction unit 2035 detects the code point of control information included in a PDCCH (DCI format) and outputs the code point to the higher layers 207.

The scheduling unit 205 analyzes the control data output from the data extraction unit 2035, generates uplink scheduling information, and indicates the data control unit 2011 to allocate user data and control data to a PUSCH and a PUCCH based on the scheduling information.

Furthermore, the scheduling unit 205 includes a reference signal control unit 2051. The reference signal control unit 2051 extracts SRS configuration information based on scheduling information transmitted from the base station apparatus 1. Furthermore, the reference signal control unit 2051 performs transmission control when an SRS, and a PUSCH and/or a PUCCH are generated at the same timing, and generates SRS transmission control information. The reference signal control unit 2051 outputs the SRS configuration information and the SRS transmission control information to the reference signal generation unit 206. Here, the SRS configuration information is information for setting parameters such as an SRS transmission bandwidth, and a transmission period. The SRS transmission control information is information indicating an SRS transmission control method when an SRS and other uplink channels (a PUSCH and/or a PUCCH) are allocated at the same subframe. For example, when an SRS and a PUCCH are generated in the same subframe, the SRS transmission control information is information for indicating the mobile station apparatus 3 to perform processing that the SRS is not transmitted.

In uplink scheduling, the scheduling unit 205 generates scheduling information used in: scheduling processing for mapping, to a transport channel, a logical channel of the uplink input from the higher layers 207; and the uplink scheduling, based on: a buffer situation of the uplink input from the higher layers 207; uplink scheduling information from the base station apparatus 1 that is input from the data extraction unit 2035 (a transport format, HARQ retransmission information, and the like); scheduling information input from the higher layers 207; and the like. About the uplink transport format, information notified from the base station apparatus 1 is utilized. This scheduling information is output to the data control unit 2011.

Furthermore, the scheduling unit 205 maps a logical channel of the uplink input from the higher layers 207 to a transport channel, and outputs the resultant to the data control unit 2011. Furthermore, the scheduling unit 205 outputs also a CSI, CQI, PMI, and RI input from the channel estimation unit 208, and a CRC check result input from the data extraction unit 2035 to the data control unit 2011. Furthermore, after the scheduling unit 205, if necessary, processes control data and a transport channel obtained in the downlink that are input from the data extraction unit 2035, the scheduling unit 205 maps the resultant to a logical channel of the downlink, and outputs the resultant to the higher layers 207.

The channel estimation unit 208 estimates a downlink channel state from a DL-RS for the demodulation of downlink data, and outputs the estimation result to the demodulation unit 2033. Furthermore, the channel estimation unit 208 estimates a downlink channel state from a downlink reference signal in order to notify the base station apparatus 1 of the estimation result of the downlink channel state (a radio channel state, CSI, CQI, PMI, and RI), and outputs this estimation result to the scheduling unit 205 as a CSI, CQI, PMI, and RI, for example.

The reference signal generation unit 206 generates an SRS (A-SRS, and P-SRS) based on SRS configuration information and SRS transmission control information input from the reference signal control unit 2051, and outputs the resultant to the radio transmission unit 2015.

The higher layers 207 performs processing of a medium access control (MAC) layer, a radio link control (RLC) layer, a packet data convergence protocol (PDCP) layer, and a radio resource control (RRC) layer. Since the higher layers 207 controls processing units of the lower layer integrally, interfaces between: the higher layers 207; and the scheduling unit 205, the channel estimation unit 208, the antenna 209, the transmission unit 201, and the reception unit 203 are present (however, not shown).

The higher layers 207 includes a radio resource control unit 2071 (also referred to as a control unit). The radio resource control unit 2071 performs management of various types of configuration information, management of system information, paging control, management of a communication state of its own station, mobility management of a handover and the like, management of a buffer situation, management of connection setting of unicast and multicast bearers, and management of a mobile station identity (UEID). Furthermore, the higher layers 207 extracts SRS configuration information from a radio resource control signal transmitted from the base station apparatus 1, and sets SRS parameters. Furthermore, when an indication of transmission of an A-SRS is included in a received DCI format, scheduling information in which the transmission of an A-SRS is taken into account is reset, and is output the reset scheduling information to the scheduling unit 205. Furthermore, the higher layers 207 sets the first A-SRS or the second A-SRS in accordance with the A-SRS transmission indication from the base station apparatus 1, and outputs the resultant to the scheduling unit 205 as scheduling information.

First Embodiment

A first embodiment of the present invention will be described below. In the first embodiment, the base station apparatus 1: notifies the mobile station apparatus 3 of transmission control information for setting, to the mobile station apparatus 3, whether to transmit a first sounding reference signal assigned in a physical uplink shared channel resource or to transmit a second sounding reference signal assigned in a resource different from the physical uplink shared channel resource; and notifies the mobile station apparatus 3 of an uplink grant including an indication of transmission of a sounding reference signal. When receiving the indication of transmission of the sounding reference signal included in the uplink grant, the mobile station apparatus 3 transmits the first sounding reference signal to the base station apparatus 1 when the transmission of the first sounding reference signal is set by the transmission control information, and transmits the second sounding reference signal to the base station apparatus 1 when the transmission of the second sounding reference signal is set by the transmission control information.

In the first embodiment, the base station apparatus 1 determines (controls), by a radio resource control signal (RRC signaling), a radio resource in which an A-SRS is assigned. That is, the base station apparatus 1 can indicate, by using RRC signaling, the mobile station apparatus 3 to: assign a first A-SRS in a PUSCH resource allocated by an uplink grant; and transmit it. Furthermore, the base station apparatus 1 can indicate, by using RRC signaling, the mobile station apparatus 3 to: assign a second A-SRS in a resource set (independently from the PUSCH resource); and transmit it to the base station apparatus 1. That is, the base station apparatus 1 can indicate, by using RRC signaling, the mobile station apparatus 3 on whether the mobile station apparatus 3 assigns an A-SRS in a PUSCH resource and transmits it, or assigns the A-SRS in a resource set (independently from the PUSCH resource), and transmits it.

For example, the base station apparatus 1 determines (controls), by a radio resource control signal (RRC signaling) in accordance with a change in the communication environment of the mobile station apparatus 3, a radio resource in which an A-SRS is assigned. For example, when it is determined that the communication environment of the mobile station apparatus 3 becomes worse, the base station apparatus 1 can indicate the mobile station apparatus 3 to perform transmission of the first A-SRS assigned by utilizing a PUSCH resource; and when it is determined that the communication environment of the mobile station apparatus 3 becomes better, the base station apparatus 1 can indicate the mobile station apparatus 3 to transmits the second A-SRS with a wider transmission bandwidth in which parameters are set independently from the PUSCH. Furthermore, for example, when it is determined that the mobile station apparatus 3 is in a cell edge, the base station apparatus 1 can indicate the mobile station apparatus 3 to perform transmission of the first A-SRS assigned in a PUSCH resource; and when it is determined that the mobile station apparatus 3 is at the cell center, the base station apparatus 1 can indicate the mobile station apparatus 3 to transmits the second A-SRS with a wider transmission bandwidth in which parameters are set independently from the PUSCH (which is assigned in a resource different from the PUSCH). Here, for the mobile station apparatus 3 performing communication by using a plurality of unlink component carriers, the base station apparatus 1 may be preset, for each unlink component carrier, which A-SRS is used to perform transmission, or may set the same A-SRS (any one of the first A-SRS or the second A-SRS) for each the mobile station apparatus 3.

Figure 3:
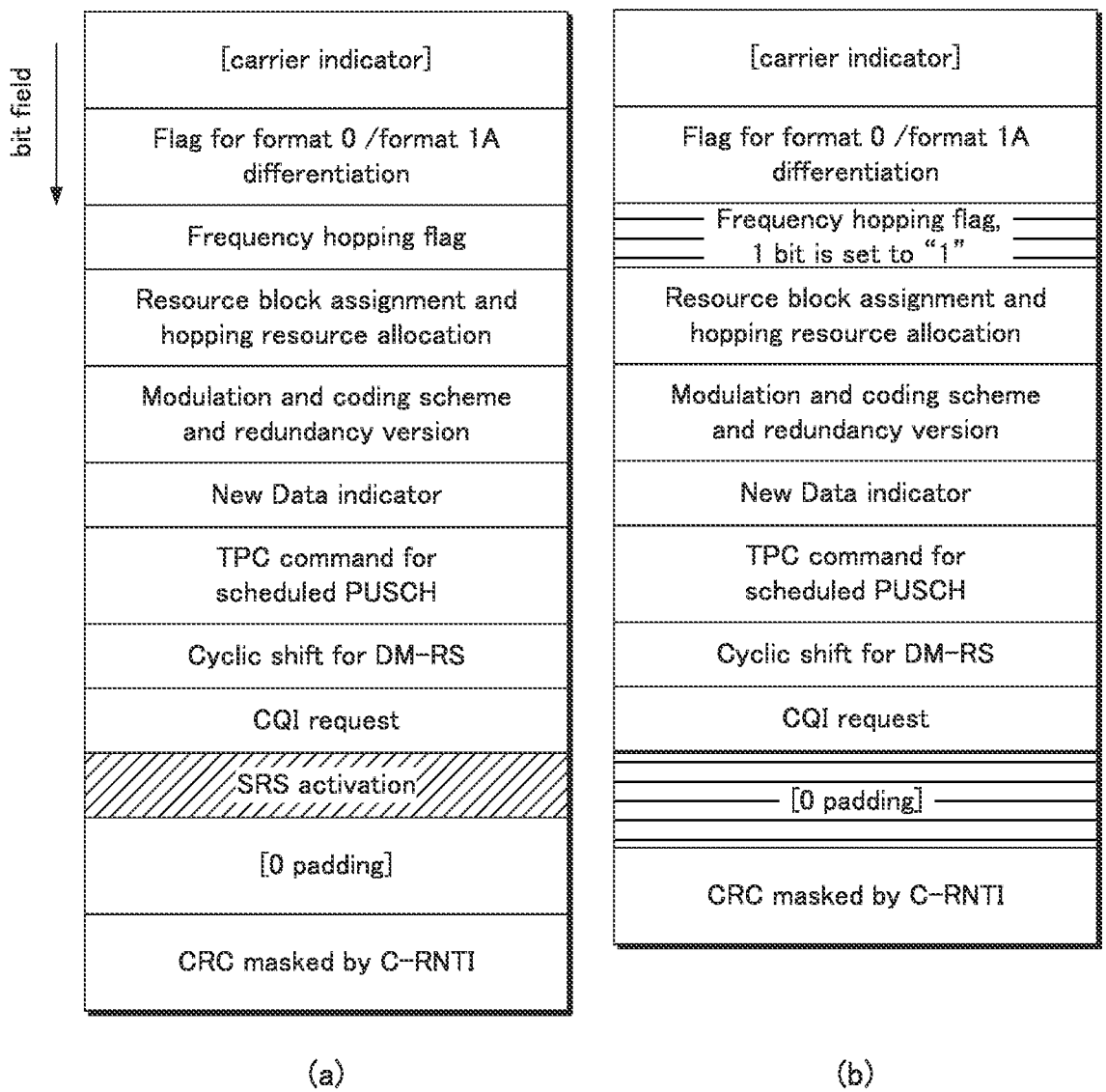
FIGS. 3(a) and 3(b) are views showing an example of a DCI Format including an indication of transmission of an A-SRS in a first embodiment.

FIGS. 3(a) and 3(b) are views showing an example of a DCI format including an indication of transmission of an A-SRS in the first embodiment. The DCI format (uplink grant) illustrated in FIG. 3(a) indicates that the DCI format (uplink grant) includes carrier indicator (CI) information indicating from which uplink component carrier an uplink signal is transmitted (in which component carrier a PUSCH scheduled by the DCI format is assigned), PDCCH format identification (Flag for format 0/format 1A differentiation)

information, a frequency hopping flag, resource block assignment and hopping resource allocation information, modulation and coding scheme and redundancy version information, NDI (New Data Indicator) information, information of transmission power control (TPC) command for the scheduled PUSCH, information of a cyclic shift for a DM-RS, CQI transmission indication (also referred to as a CQI request) information, padding bit (0 padding) information, cyclic redundancy check (CRC) information and information of the indication of transmission of an A-SRS (SRS activation, an SRS request, or a trigger for SRS transmission) (defined so as to give the indication of transmission of an A-SRS, for example represented by one bit).

In FIG. 3(a), when an indication of transmission of an A-SRS is included in the uplink grant, the mobile station apparatus 3 transmits the first A-SRS or the second A-SRS to the base station apparatus 1 in accordance with a radio resource control signal notified from the base station apparatus 1. That is, when the field defined for the indication of transmission of an A-SRS included in the uplink grant is set at a predetermined value (for example, "1"), the mobile station apparatus 3 transmits an A-SRS to the base station apparatus 1 in a certain subframe.

FIG. 3(b) shows an A-SRS transmission indication method when A-SRS transmission indication information is not included in the DCI format. In FIG. 3(b), when the frequency hopping flag and the padding bit information each are a predetermined code point (predetermined value), the mobile station apparatus 3 recognizes that an indication of transmission of an A-SRS is notified, and transmits an A-SRS to the base station apparatus 1.

Furthermore, in FIGS. 3(a) and 3(b), when the CQI transmission indication included in the uplink grant is also set (for example, the CQI request is set at "1"), a CQI and an A-SRS are transmitted to the base station apparatus 1 in the same subframe. Here, the mobile station apparatus 3 assigns the CQI and UL-SCH data (Uplink Shared Channel data, a transport block for an UL-SCH) in a PUSCH, and transmits them together with the A-SRS to the base station apparatus 1 in the same subframe.

Here, at this time, cyclic shifts applied to the A-SRSs (each of the first A-SRS and the second A-SRS) may be the same as that of a P-SRS, may be defined in association with the cyclic shift of a DM-RS, may be uniquely predetermined in the system, may be notified from the base station apparatus 1 to the mobile station apparatuses 3 as broadcast information at a time, or may be notified from the base station apparatus 1 to individual mobile station apparatuses 3. Furthermore, when the number of times of transmission of the A-SRSs (each of the first A-SRS and the second A-SRS) and a transmission timer are preset by the base station apparatus 1, and the mobile station apparatus 3 is notified by using a radio resource control signal, or the like, the mobile station apparatus 3 transmits A-SRSs to the base station apparatus 1 until the number of times of transmission and the transmission timer are expired.

Furthermore, the parameters of the second A-SRS may be the same as those of the P-SRS, may be uniquely predetermined in the system, may be notified from the base station apparatus 1 to the mobile station apparatuses 3 as broadcast information at a time, or may be notified from the base station apparatus 1 to individual mobile station apparatuses 3. Respective different cyclic shifts may be applied to the first A-SRS and the second A-SRS. For example, the cyclic shift of the first A-SRS may be made the same cyclic shift as a DM-RS transmitted in the same subframe, the cyclic shift of the second A-SRS may be notified from the base station apparatus 1 to each mobile station apparatus 3 by a radio resource control signal. Furthermore, the cyclic shifts of the first A-SRS and the second A-SRS may be associated with parameters applied to the cyclic shift of a DM-RS (for example, a cyclic shift index of the DM-RS, and cyclic shift information of the DM-RS), and different values may be individually applied to the cyclic shifts of the first A-SRS and the second A-SRS, or the same value may be applied to the cyclic shifts of the first A-SRS and the second A-SRS. That is, the base station apparatus 1 can set the cyclic shift of the first A-SRS and the cyclic shift of the second A-SRS so as to associate the cyclic shift of the first A-SRS and the cyclic shift of the second A-SRS with parameters applied to the cyclic shift of the DM-RS, and the mobile station apparatus 3 can uniformly (mechanically) set the cyclic shifts applied to the first A-SRS and the second A-SRS from the parameters applied to the DM-RS.

Second Embodiment

A second embodiment of the present invention will now be described below. In the second embodiment, when the base station apparatus 1 indicates the mobile station apparatus 3 to perform transmission of the first sounding reference signal assigned in a physical uplink shared channel resource, the base station apparatus 1 sets transmission indication information included in an uplink grant as a first value; and when the base station apparatus 1 indicates the mobile station apparatus 3 to perform transmission of the second sounding reference signal assigned in a resource different from the physical uplink shared channel resource, the base station apparatus 1 sets the transmission indication information as a second value. Furthermore, the base station apparatus 1 notifies the mobile station apparatus 3 of the uplink grant including the transmission indication information set at the first value or the second value. When the transmission indication information included in the uplink grant is the first value, the mobile station apparatus 3 transmits the first sounding reference signal to the base station apparatus 1; and when the transmission indication information included in the uplink grant is the second value, the mobile station apparatus 3 transmits the second sounding reference signal to the base station apparatus 1.

In the second embodiment, by adding A-SRS transmission indication information configured by a plurality of bits (a bit sequence) not less than two bits to a DCI format (uplink grant), in accordance with the bit sequence (a predetermined value) represented by the A-SRS transmission indication information, it is possible to dynamically switch transmission of the first A-SRS and the second A-SRS. That is, since the base station apparatus 1, if necessary, can dynamically control an A-SRS transmission method of the mobile station apparatus 3, and can perform optimal channel estimation, it is possible to perform effective communication between the base station apparatus 1 and the mobile station apparatus 3.

That is, the base station apparatus 1 can indicate, by using A-SRS transmission indication information, the mobile station apparatus 3 to: assign the first A-SRS in a PUSCH resource allocated by an uplink grant; and transmit it. Furthermore, the base station apparatus loan indicate, by using A-SRS transmission indication information, the mobile station apparatus 3 to: assign the second A-SRS in a resource set (independently from the PUSCH resource); and transmit it to the base station apparatus 1. That is, the base station apparatus 1 can indicate, by using A-SRS transmission indication information, the mobile station apparatus 3 on whether the mobile station apparatus 3 assigns an A-SRS in a PUSCH resource and transmits it, or assigns the A-SRS in a resource set (independently from the PUSCH resource) and transmits it.

Figure 4:
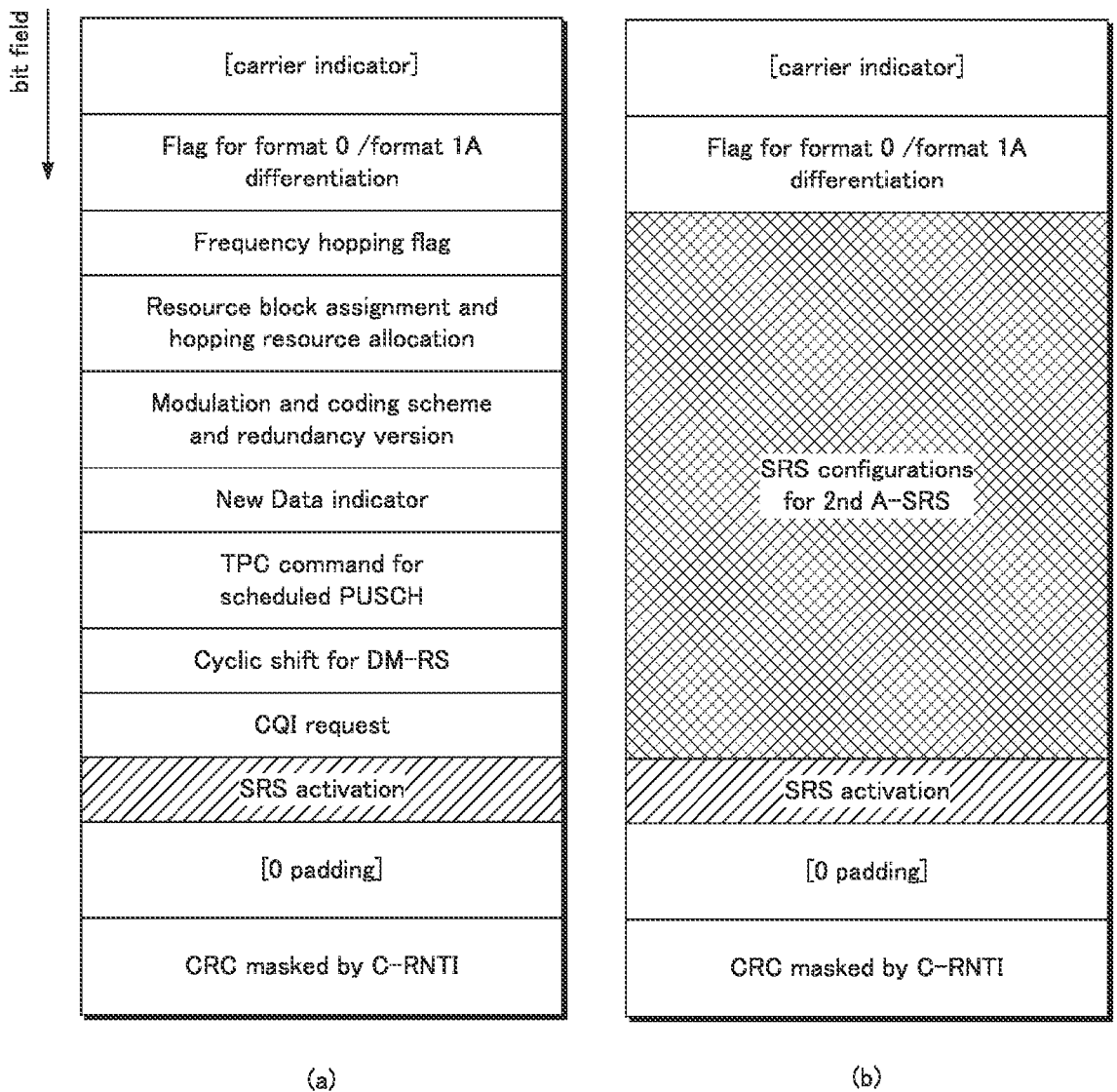
FIGS. 4(a) and 4(b) are views showing an example of a DCI Format including an indication of transmission of an A-SRS in a second embodiment.

FIGS. 4(a) and 4(b) are views showing an example of a DCI format including an indication of transmission of an A-SRS in the second embodiment. Although the DCI format illustrated in FIG. 4(a) is the same in configuration as the DCI format illustrated in FIG. 3(a), A-SRS transmission indication information is configured by a plurality of bits not less than two bits. A-SRS transmission indication information is configured by a plurality of bits not less than two bits, and thus, it is possible to dynamically switch indication of transmission of the first A-SRS and the second A-SRS.

FIG. 4(a) shows a structure of control information when A-SRS transmission indication (SRS activation) information is added to the DCI format. For example, the A-SRS transmission indication information is configured by two bits, "00" represents the stop of transmission of an A-SRS, "01" represents a first A-SRS transmission, and "10" represents a second A-SRS transmission. Furthermore, as in FIG. 4(b), when the A-SRS transmission indication information is "11", control information included in the DCI format is recognized as different control information from the control information shown in FIG. 4(a). For example, control information other than A-SRS transmission indication information is recognized as setting information (SRS configurations for the 2nd A-SRS) giving indication of the parameters of the second A-SRS such as the transmission bandwidth and the cyclic shift of the second A-SRS. Because of this, it is possible to perform setting so as to transmit the second A-SRS in which the parameters based on the setting information are set. The mobile station apparatus 3 can dynamically switch the first A-SRS and the second A-SRS, and perform A-SRS transmission. Here, a transmission bandwidth (SRS transmission bandwidth) when the mobile station apparatus 3 transmits the second A-SRS is included in the parameters (SRS configurations for the 2nd A-SRS) of the second A-SRS included in the setting information. Furthermore, a cyclic shift used in order to maintain the orthogonality between the mobile station apparatuses 3 or between signals is included in the parameters of the second A-SRS. Furthermore, information indicating a frequency position at which the second A-SRS is assigned is included in the parameters of the second A-SRS. Furthermore, the number of times of transmission or a transmission stop time for expiring transmission of the second A-SRS are included in the parameters of the second A-SRS. Furthermore, an antenna port (antenna index) for transmitting the second A-SRS is included in the parameters of the second A-SRS. Furthermore, a multiple-antenna simultaneous transmission flag indicating whether or not to perform transmission of an A-SRS by simultaneously using multiple antennas as in MIMO is included in the parameters of the second A-SRS. Furthermore, a TPC command (transmission power control information) for the second A-SRS is included in the parameters of the second A-SRS. Furthermore, which parameter of these parameters of the second A-SRS is used may be uniquely predetermined in the system, may be notified from the base station apparatus 1 to the mobile station apparatuses 3 as broadcast information at a time, or may be notified from the base station apparatus 1 to individual mobile station apparatuses 3.

Third Embodiment

A third embodiment of the present invention will now be described below. In the third embodiment, when the base station apparatus 1 indicates the mobile station apparatus 3 to perform transmission of the first sounding reference signal assigned in a physical uplink shared channel resource, the base station apparatus 1 sets transmission indication information of one bit included in an uplink grant at a predetermined value; and when the base station apparatus 1 indicates the mobile station apparatus 3 to perform transmission of the second sounding reference signal assigned in a resource different from the physical uplink shared channel resource, the base station apparatus 1 sets first control information included in the uplink grant at a predetermined code point. Furthermore, the base station apparatus 1 sets the indication of transmission of a sounding reference signal with the transmission indication information or the first control information, notifies the mobile station apparatus 3 of the uplink grant including the transmission indication information set at the predetermined value or the first control information set at the predetermined code point, and thus, notifies the mobile station apparatus 3 of the uplink grant including the indication of transmission of a sounding reference signal. When the transmission indication information included in the uplink grant indicates the indication of transmission of a sounding reference signal, the mobile station apparatus 3 transmits the first sounding reference signal to the base station apparatus 1; and when the first control information included in the uplink grant is a predetermined code point, the mobile station apparatus 3 transmits the second sounding reference signal to the base station apparatus 1.

In the third embodiment, the base station apparatus 1 notifies the mobile station apparatus 3 of an indication of transmission of the first A-SRS by transmission indication information of one bit (SRS activation for the 1st A-SRS), and notifies the mobile station apparatus 3 of an indication of transmission of the second A-SRS by the first control information that is a predetermined code point. That is, the base station apparatus 1 can indicate, by using transmission indication information of one bit, the mobile station apparatus 3 to: assign the first A-SRS in a PUSCH resource allocated by an uplink grant; and transmit it. Furthermore, the base station apparatus 1 can indicate, by using the first control information that is a predetermined code point (predetermined control information set at a predetermined value), the mobile station apparatus 3 to: assign the second A-SRS in a resource set (independently from the PUSCH resource); and transmit it to the base station apparatus 1. Here, it is predefined by specifications and the like that what control information included in a DCI format (uplink grant) is set at predetermined control information (the first control information), and an indication of transmission of the second A-SRS is performed by the base station apparatus 1 in accordance with at what value the predetermined control information is set.

Here, when the transmission of the second A-SRS is notified by the first control information, control information fields other than the first control information may be used for indicating other control information. For example, the base station apparatus 1 can perform allocation to the mobile station apparatus 3 as a parameter of the second A-SRS in the control information field other than the first control information. A transmission bandwidth (SRS transmission bandwidth) when the mobile station apparatus 3 transmits the second A-SRS is included in the parameter of the second A-SRS (SRS configurations for the 2nd A-SRS). Furthermore, a cyclic shift used in order to maintain the orthogonality between the mobile station apparatuses 3 or between signals is included in parameters of the second A-SRS. Furthermore, information indicating a frequency position at which the second A-SRS is assigned is included in the parameters of the second A-SRS. Furthermore, the number of times of transmission or a transmission stop time for expiring transmission of the second A-SRS are included in the parameters of the second A-SRS. Furthermore, an antenna port (antenna index) for transmitting the second A-SRS is included in the parameters of the second A-SRS. Furthermore, a multiple-antenna simultaneous transmission flag indicating whether or not to perform transmission of the second A-SRS by simultaneously using multiple antennas as in MIMO is included in the parameters of the second A-SRS. Furthermore, a TPC command (transmission power control information) for the second A-SRS is included in the parameters of the second A-SRS. Furthermore, which parameter of these parameters of the second A-SRS is used may be uniquely predetermined in the system, may be notified from the base station apparatus 1 to the mobile station apparatuses 3 as broadcast information at a time, or may be notified from the base station apparatus 1 to individual mobile station apparatuses 3.

In the third embodiment, in accordance with the communication environment of the mobile station apparatus 3, the base station apparatus 1 can dynamically change parameters such as the transmission bandwidth, transmission timing, and cyclic shift of the second A-SRS, can reduce interference in the other mobile station apparatuses 3, can perform flexible SRS assignment, and can perform improve communication quality.

Furthermore, by controlling the indication of transmission of the second A-SRS by using the first control information that is a predetermined code point with little false detection, it is possible to reduce the unnecessary transmission of the second A-SRS, and to reduce the effect of interference in the SRSs of the other mobile station apparatuses 3 due to the false transmission of the second A-SRS.

Figure 5:
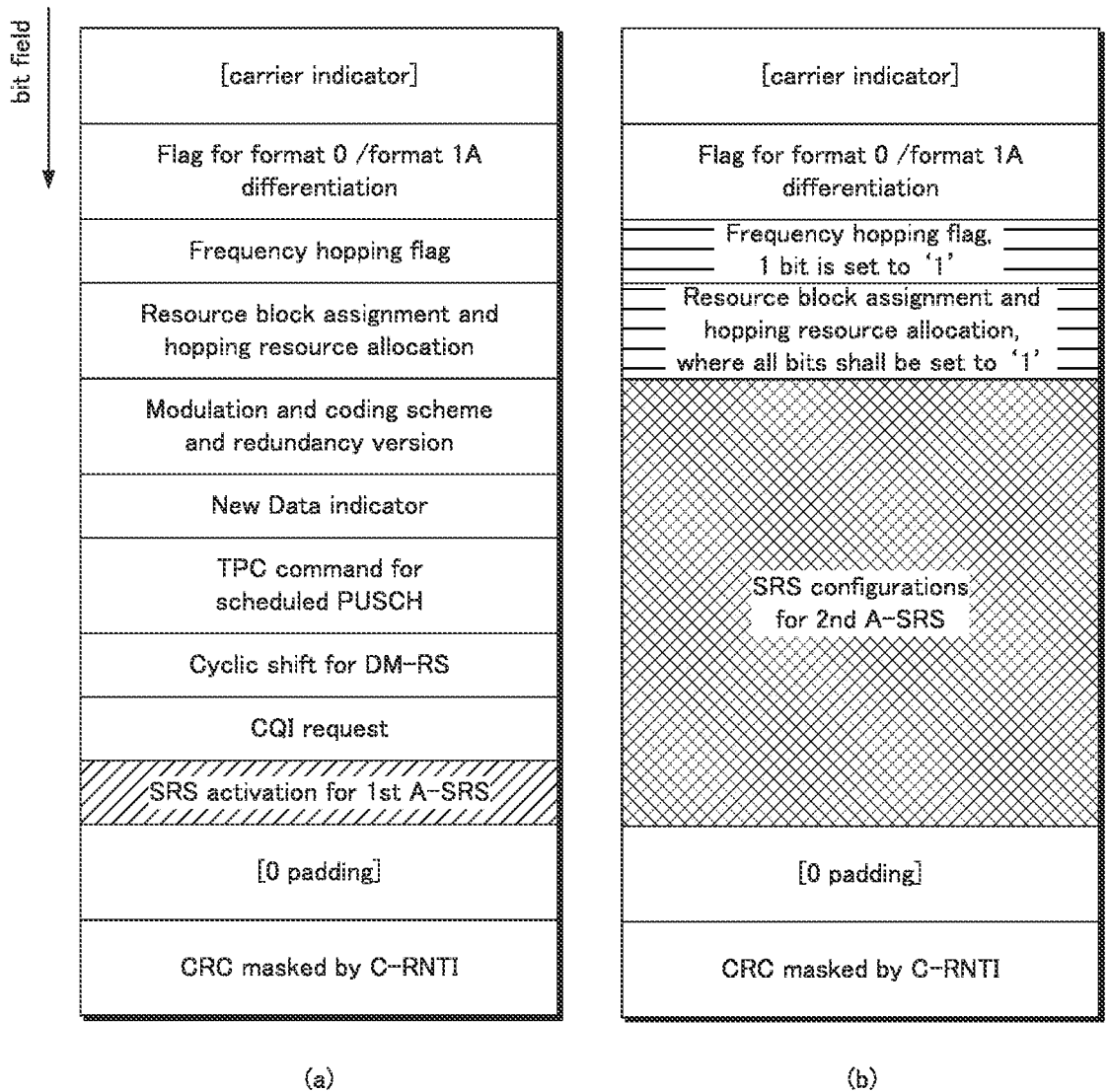
FIGS. 5(a) and 5(b) are views showing an example of a DCI Format including an indication of transmission of an A-SRS in a third embodiment.
Figure 6:
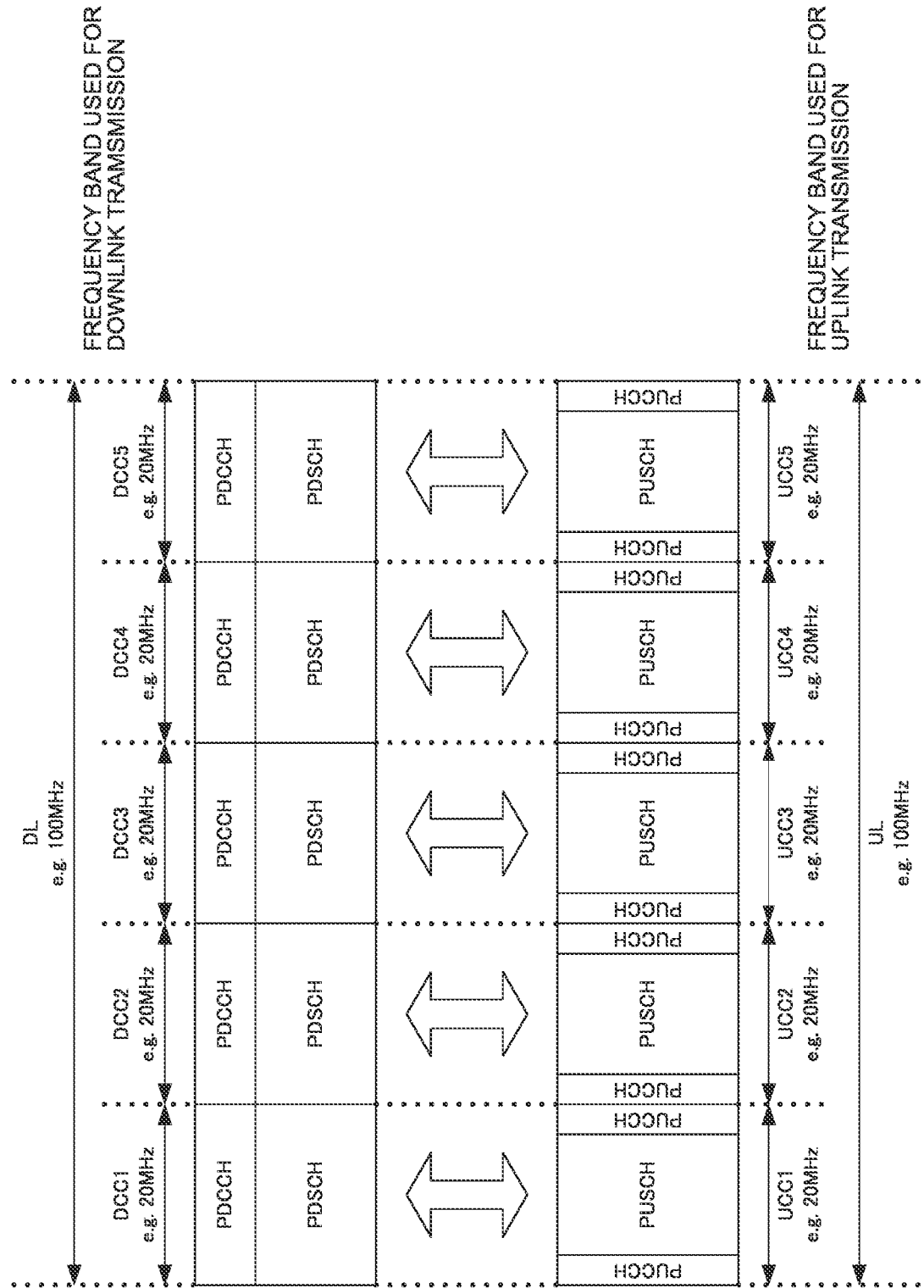
FIG. 6 is a view showing an example of carrier aggregation in the conventional art.
Figure 7:
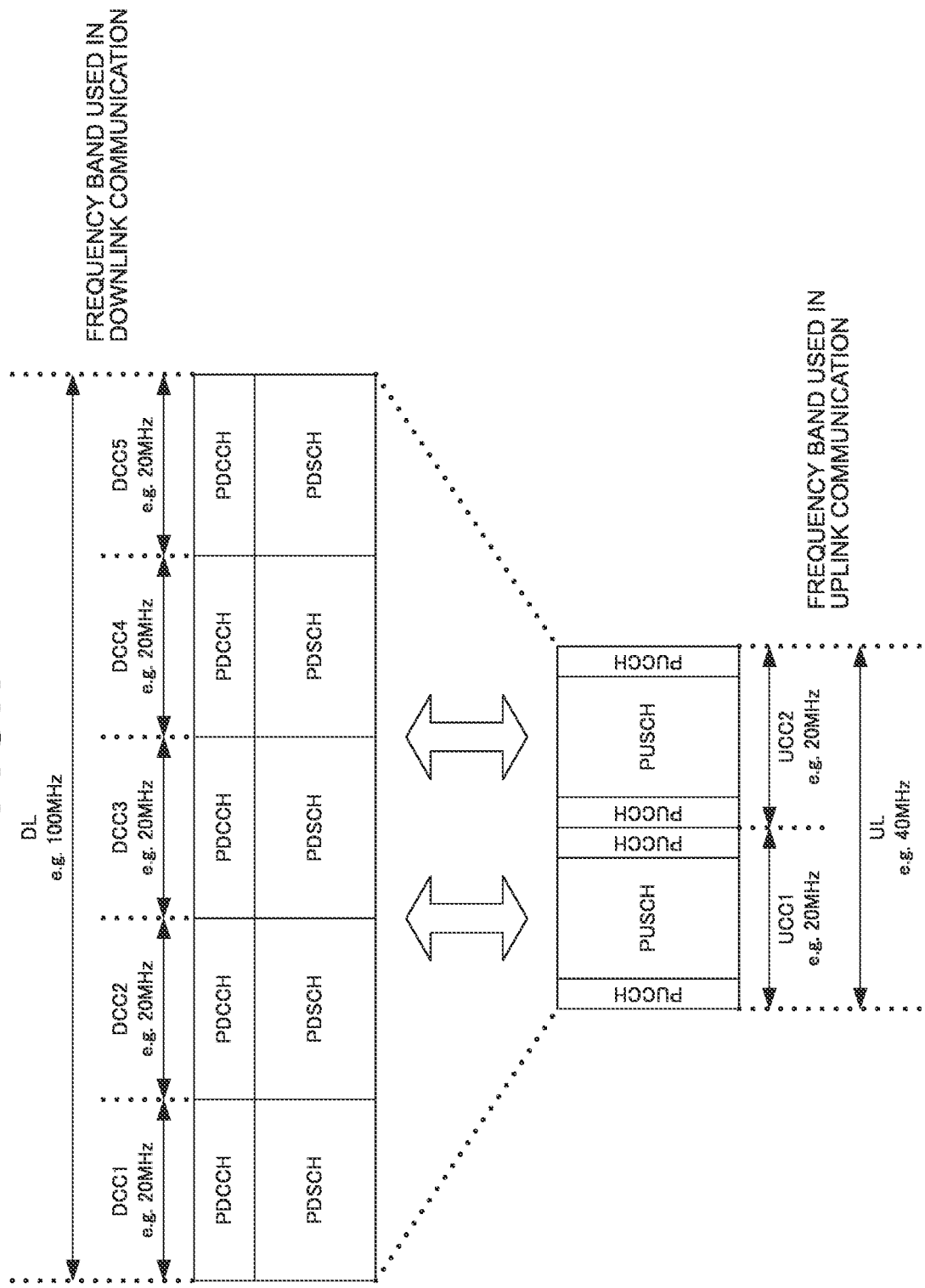
FIG. 7 is a view showing an example of asymmetric carrier aggregation in the conventional art.

FIGS. 5(a) and 5(b) are views showing an example of a DCI format including an indication of transmission of an A-SRS in the third embodiment. The DCI format (uplink grant) illustrated in FIG. 5(a) indicates that the DCI format (uplink grant) includes carrier indicator (CI) information indicating from which uplink component carrier an uplink signal is transmitted (in which uplink component carrier a PUSCH scheduled by the DCI format is assigned), PDCCH format identification (Flag for format 0/format 1A differentiation) information, a frequency hopping flag, resource block assignment and hopping resource allocation information, modulation and coding scheme and redundancy version information, NDI (New Data Indicator) information, information of transmission power control (TPC) command for the scheduled PUSCH, information of a cyclic shift for a DM-RS, CQI transmission indication (also referred to as CQI request) information, padding bit (0 padding) information, cyclic redundancy check (CRC) information and information of the indication of transmission of an A-SRS (SRS activation, an SRS request, or a trigger for SRS transmission) (defined so as to give the indication of transmission of an A-SRS, for example represented by one bit).

In FIG. 5(a), when the indication of transmission of an A-SRS is set, the mobile station apparatus 3 transmits a PUSCH and an A-SRS to the base station apparatus 1 in the same subframe. That is, when the field defined for the indication of transmission of an A-SRS that is included in the uplink grant is set at for example, "1", the mobile station apparatus 3 transmits both the PUSCH and the A-SRS to the base station apparatus 1 in a certain subframe. Furthermore, at this time, when an indication of transmission of a CQI included in the uplink grant is also set (for example, the CQI request is set at "1"), a CQI and the A-SRS are transmitted to the base station apparatus 1 in the same subframe. Here, the mobile station apparatus 3 assigns the CQI and UL-SCH data (Uplink Shared Channel data, a transport block for an UL-SCH) in the PUSCH, and transmits them together with the A-SRS to the base station apparatus 1 in the same subframe.

Furthermore, at this time, the base station apparatus 1 can indicate the mobile station apparatus 3 to perform transmission of only a CQI (transmission of a CQI without UL-SCH data, and transmission of only uplink control information). For example, the base station apparatus 1 can instruct the mobile station apparatus 3 to perform transmission of only a CQI by setting the predetermined information of an uplink grant at a predetermined value (at a predetermined code point). For example, the base station apparatus 1 can instruct the mobile station apparatus 3 to perform transmission of only a CQI by setting the resource block assignment, the MCS information, and the CQI request included in an uplink grant at predetermined values, and notifying the mobile station apparatus 3 of them. The mobile station apparatus 3 notified of an indication of transmission of an A-SRS (for example, indicated by one bit) and predetermined information set at a predetermined code point that gives an indication of transmission of only a CQI from the base station apparatus 1 assigns only a CQI in a PUSCH (assigns the CQI without UL-SCH data), and transmits the PUSCH together with an A-SRS to the base station apparatus 1 in the same subframe.

FIG. 5(b) shows a case where the frequency hopping flag, and the resource block assignment and hopping resource allocation information are set at predetermined code points, as an example. That is, FIG. 5(b) shows a case where the first control information (predetermined information) is composed of a frequency hopping flag, and resource block assignment and hopping resource allocation information. When the first control information is a predetermined code point, the mobile station apparatus 3 transmits an A-SRS without a PUSCH to the base station apparatus 1. That is, when the frequency hopping flag, and resource block assignment and hopping resource allocation information (the first control information) that are predefined as predetermined information are set at predetermined values, the mobile station apparatus 3 transmits only an A-SRS without a PUSCH to the base station apparatus 1 in a certain subframe.

In FIGS. 5(a) and 5(b), A-SRS transmission indication information is predefined as control information included in the DCI format (uplink grant). Furthermore, an indication of transmission of an A-SRS can be performed by using control information other than the A-SRS transmission indication information. As the method, when the first control information is a predetermined code point (predetermined value), the mobile station apparatus 3 recognizes that an indication of transmission of the second A-SRS is performed. Furthermore, at this time, the base station apparatus 1 can also reuse the A-SRS transmission indication information as a field for indicating other control information. The mobile station apparatus 3 can read control information that is not used in the first control information as other control information (for example, A-SRS configuration information).

Here, that the base station apparatus 1 instructs the transmission of an A-SRS by the transmission indication information of one bit indicates that the base station apparatus 1 notifies the mobile station apparatus 3 of information that is included in an uplink grant and gives an indication of transmission of an A-SRS (A-SRS transmission indication information), and thus, instructs the mobile station apparatus 3 to perform the transmission of an A-SRS. For example, the base station apparatus 1 can indicate the mobile station apparatus 3 to perform transmission of an A-SRS by setting, at "1", information that is included in an uplink grant and gives an indication of transmission of an A-SRS, and notifying the mobile station apparatus 3 of it. That is, the base station apparatus 1 can indicate the mobile station apparatus 3 to perform transmission of an A-SRS by setting control information defined for an indication of transmission of an A-SRS at a predetermined value (for example, "1"), and notifying the mobile station apparatus 3 of it. Here, when the base station apparatus 1 does not perform transmission of an A-SRS to the mobile station apparatus 3, the base station apparatus 1 sets, at, for example, "0", information that is included in an uplink grant and gives an indication of transmission of an A-SRS, and notifying the mobile station apparatus 3 of it.

Furthermore, that the base station apparatus 1 gives an indication of transmission of an A-SRS by control information (the first control information) that is a predetermined code point (predetermined value) indicates that the base station apparatus 1 indicates the mobile station apparatus 3 to perform the transmission of an A-SRS by setting, at a predetermined value, predetermined information of control information (any of the above-described control information) included in an uplink grant. For example, the base station apparatus 1 can indicate the mobile station apparatus 3 to perform transmission of an A-SRS by: setting, at predetermined values (for example, by setting all fields at "1"), the frequency hopping flag, and resource block assignment and hopping resource allocation information included in an uplink grant; and notifying the mobile station apparatus 3 of them. Here, it is predefined by specifications and the like, and is known between the base station apparatus 1 and the mobile station apparatus 3 that the base station apparatus 1 indicates the mobile station apparatus 3 to perform transmission of an A-SRS in accordance with what control information in an uplink grant is set and at what value the control information is set. That is, for example, the base station apparatus 1 can indicate the mobile station apparatus 3 to perform transmission of an A-SRS by: setting, at predetermined values (for example, by setting all fields at "1"), control information defined for applications (for example, a frequency hopping flag, resource block assignment, and hopping resource allocation) other than the indication of transmission of an A-SRS; and notifying the mobile station apparatus 3 of them. Here, the above-described control information (for example, indicated by one bit) defined for an indication of transmission of an A-SRS may be included in predetermined information set at a predetermined value for the base station apparatus 1 to indicate the mobile station apparatus 3 to perform transmission of an A-SRS.

By giving an indication of transmission of an A-SRS by control information that is a predetermined code point, the base station apparatus 1 can indicate the mobile station apparatus 3 to transmit only an A-SRS, irrespective of the value set in A-SRS transmission indication information included in an uplink grant.

In the third embodiment, when an A-SRS transmission indication is indicated by transmission indication information of one bit in an uplink grant, the mobile station apparatus 3 transmits, to the base station apparatus 1, a PUSCH and the first A-SRS in the same subframe. Furthermore, when the first control information is a predetermined code point, when indications of transmission of a PUSCH are received by different uplink grants at the same timing, the mobile station apparatus 3 may transmit a PUSCH to the base station apparatus 1 in a fourth subframe from a subframe in which the uplink grants are received, and the mobile station apparatus 3 may transmit the second A-SRS in the initial cell-specific SRS subframe or mobile station apparatus-specific SRS subframe in the fourth and subsequent subframes from a subframe where SRS indication information is detected in the uplink grant. Furthermore, a subframe transmitting the second A-SRS may be uniquely predetermined in the system, may be notified from the base station apparatus 1 to the mobile station apparatuses 3 as broadcast information at a time, or may be notified from the base station apparatus 1 to individual mobile station apparatuses 3.

Furthermore, in the third embodiment, when a DCI format including an indication of transmission of an A-SRS indicated by a predetermined code point is assigned in a CSS, another control information field that is not used in the indication of transmission of an A-SRS may be used for the group scheduling of transmission of an A-SRS.

In the third embodiment, the mobile station apparatus 3 can dynamically switch the first A-SRS and the second A-SRS, can transmit it to the base station apparatus 1, and can perform channel estimation tailored for communication environment, regardless of the presence or absence of PUSCH transmission by indicating A-SRS transmission indication included in an uplink grant by transmission indication information of one bit, or the first control information that is a predetermined code point.

Furthermore, in the third embodiment, when PUSCH transmission is not necessary, the transmission of an A-SRS can be performed without a PUSCH, and thus, the effect of interference in the other mobile station apparatuses 3 can be reduced.

Furthermore, in the first to third embodiments, when an indication of transmission of an A-SRS is included in a DCI format including an indication of transmission of a CQI, the mobile station apparatus 3 may transmit, to the base station apparatus 1, a CQI and an A-SRS in the same subframe, and may transmit them in different subframes.

Furthermore, in the first to third embodiments, when communication is performed by using a plurality of unlink component carriers, the corresponding parameter of the second A-SRS may be set for each unlink component carrier, or may be set for each the mobile station apparatus 3.

According to the present invention, the base station apparatus 1 can indicate the mobile station apparatus 3 to switch the first A-SRS and the second A-SRS and transmit it, in accordance with a communication environment (including communication quality, channel quality, a communication state, a channel state, and a radio channel state), the position of the mobile station apparatus 3 (for example, a cell center and a cell edge), and the number of the mobile station apparatuses in a cell. For example, if the first A-SRS (inband A-SRS) assigned in a PUSCH resource is transmitted in an environment of poor communication quality as in a cell edge, channel estimation accuracy is improved. Furthermore, if the second A-SRS (outband A-SRS) having a wider transmission bandwidth that is assigned in a resource different from the PUSCH is transmitted in an environment of good communication quality as in a cell center, the improvement of communication quality due to frequency selection scheduling can be provided. That is, it is possible to realize effective communication between the base station apparatus 1 and the mobile station apparatus 3 by dynamically switching the first A-SRS and the second A-SRS in accordance with a communication environment, or the like.

A part of functions of the base station apparatus 1 and the mobile station apparatus 3 in the above-described embodiments may be realized by a computer. In that case, a program for realizing these control functions may be recorded on a computer readable recording medium, and the program recorded on this recording medium may be read and executed by a computer system, thereby realizing the functions. The "computer system" as used herein includes also OS and hardware such as a peripheral device. Furthermore, the "computer readable recording medium" refers to portable mediums such as a flexible disk, a magnetic optical disk, a ROM, and a CD-ROM, and a storage device such as a hard disk built in a computer system. Furthermore, the "computer readable recording medium" may include a medium dynamically holding a program for a short time, such as a communication line in a case where a program is transmitted through a network such as the Internet or the communication line such as a telephone line, and a medium holding a program for a given time, such as a volatile memory in a computer system serving as a server or a client in the above-described case. Furthermore, the above-described program may be one for realizing a part of the aforementioned functions, and further may be one for realizing the aforementioned functions by being combined with a program already recorded in a computer system.

Furthermore, a part or all of the mobile station apparatuses 3 and the base station apparatuses 1 in the above-described embodiments may be typically realized as an LSI (Large Scale Integration) that is an integrated circuit. Each functional block of the mobile station apparatuses 3 and the base station apparatuses 1 may be individually made into chips, or may be made into chips by integrating a part or all of them. Furthermore, circuit integration techniques are not limited to LSIs, and may be realized by dedicated circuits, or general purpose processors. Furthermore, with the advent of circuit integration technologies substituted for LSIs due to advances in semiconductor technologies, it is also possible to use an integrated circuit using the technologies.

Hereinabove, although embodiments of the present invention has been described in detail with reference to the drawings, specific configurations are not limited to these embodiments, and design and the like without departing from the scope of the present invention are also included in the claims.

DESCRIPTION OF THE REFERENCE NUMERALS 1 base station apparatus
3 mobile station apparatus
101 transmission unit (base station side transmission unit)
103 reception unit (base station side reception unit)
105 scheduling unit (base station side scheduling unit)
107, 207 higher layers
108, 208 channel estimation unit
109, 209 antenna
201 transmission unit (mobile station side transmission unit)
203 reception unit (mobile station side reception unit)
205 scheduling unit
206 reference signal generation unit
1011, 2011 data control unit
1013, 2013 modulation unit
1015, 2015 radio transmission unit
1031, 2031 radio reception unit
1033, 2033 demodulation unit
1035, 2035 data extraction unit
1071, 2071 radio resource control unit
2051 reference signal control unit

The invention claimed is:

1. A mobile station apparatus comprising:
a reception circuitry configured to receive a physical downlink control channel which is used for scheduling of a physical uplink shared channel and which includes a sounding reference signal request field that indicates whether or not to request transmission of a sounding reference signal, wherein the reception circuitry is configured to receive a plurality of sets of parameters for the sounding reference signal by using a radio resource control signal, each of the plurality of sets including a parameter related to bandwidth for the transmission of the sounding reference signal, and the reception circuitry is configured to receive a physical downlink control channel including a 2-bit sounding reference signal request field and a physical downlink control channel including a 1-bit sounding reference signal request field, a value of each sounding reference signal request field corresponding to one of the plurality of sets; and a transmission circuitry configured to transmit the sounding reference signal with a first bandwidth, in a case that one or more information bits corresponding to a first value are set to the 2-bit sounding reference signal request field, wherein the transmission circuitry is configured to transmit the sounding reference signal with a second bandwidth, in a case that one or more information bits corresponding to a second value are set to the 2-bit sounding reference signal request field.

2. The mobile station apparatus according to claim 1, wherein
the transmission circuitry is configured to transmit a sounding reference signal configured by a first set of the plurality of sets in a case that the value of the 2-bit sounding reference signal request field is a first value,
the transmission circuitry is configured to transmit a sounding reference signal configured by a second set of the plurality of sets in a case that the value of the 2-bit sounding reference signal request field is a second value, and
the transmission circuitry is configured not to transmit a sounding reference signal in a case that the value of the 2-bit sounding reference signal field is a third value.

3. The mobile station apparatus according to claim 1, wherein
the transmission circuitry is configured to transmit a sounding reference signal configured by a certain set of the plurality of sets in a case that the value of the 1-bit sounding reference signal request field is a first value, and
the transmission circuitry is configured not to transmit a sounding reference signal in a case that the value of the 1-bit sounding reference signal request field is a second value.

4. The mobile station apparatus according to claim 2, wherein
the physical downlink control channel including the 2-bit sounding reference signal request field is used for the scheduling of the physical uplink shared channel with a plurality of antenna ports.

5. A base station apparatus comprising:
a transmission circuitry configured to transmit a physical downlink control channel which is used for scheduling of a physical uplink shared channel and which includes a sounding reference signal request field that indicates whether or not to request transmission of a sounding reference signal, wherein
the transmission circuitry is configured to set one or more information bits corresponding to a first value to the 2-bit sounding reference signal request field in the physical downlink control channel, in a case that instructing a mobile station apparatus to request transmission of the sounding reference signal with a first bandwidth, the transmission circuitry is configured to set one or more information bits corresponding to a second value to the 2-bit sounding reference signal request field in the physical downlink control channel, in a case that instructing the mobile station apparatus to request transmission of the sounding reference signal with a second bandwidth, the transmission circuitry is configured to transmit a plurality of sets of parameters for the sounding reference signal by using a radio resource control signal, each of the plurality of sets including a parameter related to bandwidth for the transmission of the sounding reference signal, and the transmission circuitry is configured to transmit a physical downlink control channel including a 2-bit sounding reference signal request field and a physical downlink control channel including a 1-bit sounding reference signal request field, a value of each sounding reference signal request field corresponding to one of the plurality of sets.

6. The base station apparatus according to claim 5, wherein the transmission circuitry is configured to set the value of the 2-bit sounding reference signal request field to a first value in a case that the base station apparatus requests a mobile station apparatus to transmit a sounding reference signal configured by a first set of the plurality of sets, the transmission circuitry is configured to set the value of the 2-bit sounding reference signal request field to a second value in a case that the base station apparatus requests the mobile station apparatus to transmit a sounding reference signal configured by a second set of the plurality of sets, and the transmission circuitry is configured to set the value of the 2-bit sounding reference signal request field to a third value in a case that the base station apparatus requests the mobile station apparatus not to transmit a sounding reference signal.

7. The base station apparatus according to claim 6, wherein the transmission circuitry is configured to set the value of the 1-bit sounding reference signal request field to a first value in a case that the base station apparatus requests a mobile station apparatus to transmit a sounding reference signal configured by a certain set of the plurality of sets, and the transmission circuitry is configured to set the value of the 1-bit sounding reference signal request field to a second value in a case that the base station apparatus requests the mobile station apparatus not to transmit a sounding reference signal.

8. The base station apparatus according to claim 6, wherein the physical downlink control channel including the sounding reference signal request field is used for the scheduling of the physical uplink shared channel with a plurality of antenna ports.

9. A wireless communication method of a mobile station apparatus comprising:

receiving a physical downlink control channel which is used for scheduling of a physical uplink shared channel and which includes a sounding reference signal request field that indicates whether or not to request transmission of a sounding reference signal;

receiving a plurality of sets of parameters for the sounding reference signal by using a radio resource control signal, each of the plurality of sets including a parameter related to bandwidth for the transmission of the sounding reference signal;

receiving a physical downlink control channel including a 2-bit sounding reference signal request field and a physical downlink control channel including a 1-bit sounding reference signal request field, a value of each sounding reference signal request field corresponding to one of the plurality of sets;

transmitting the sounding reference signal with a first bandwidth, in a case that one or more information bits corresponding to a first value are set to the 2-bit sounding reference signal request field; and transmitting the sounding reference signal with a second bandwidth, in a case that one or more information bits corresponding to a second value are set to the 2-bit sounding reference signal request field.

10. The wireless communication method according to claim 9, further comprising:

transmitting a sounding reference signal configured by a first set of the plurality of sets in a case that the value of the 2-bit sounding reference signal request field is a first value;

transmitting a sounding reference signal configured by a second set of the plurality of sets in a case that the value of the 2-bit sounding reference signal request field is a second value, wherein a sounding reference signal is not transmitted in a case that the value of the 2-bit sounding reference signal field is a third value.

11. The wireless communication method according to claim 9, further comprising:

transmitting a sounding reference signal configured by a certain set of the plurality of sets in a case that the value of the 1-bit sounding reference signal request field is a first value, wherein a sounding reference signal is not transmitted in a case that the value of the 1-bit sounding reference signal request field is a second value.

12. The wireless communication method according to claim 10, wherein the physical downlink control channel including the 2-bit sounding reference signal request field is used for the scheduling of the physical uplink shared channel with a plurality of antenna ports.

13. A wireless communication method of a base station apparatus comprising:

transmitting a physical downlink control channel which is used for scheduling of a physical uplink shared channel and which includes a sounding reference signal request field that indicates whether or not to request transmission of a sounding reference signal;

setting one or more information bits corresponding to a first value to the 2-bit sounding reference signal request field in the physical downlink control channel, in a case that instructing a mobile station apparatus to request transmission of the sounding reference signal with a first bandwidth;

setting one or more information bits corresponding to a second value to the 2-bit sounding reference signal request field in the physical downlink control channel, in a case that instructing the mobile station apparatus to request transmission of the sounding reference signal with a second bandwidth;

transmitting a plurality of sets of parameters for the sounding reference signal by using a radio resource control signal, each of the plurality of sets including a parameter related to bandwidth for the transmission of the sounding reference signal; and transmitting a physical downlink control channel including a 2-bit sounding reference signal request field and a physical downlink control channel including a 1-bit sounding reference signal request field, a value of each sounding reference signal request field corresponding to one of the plurality of sets.

14. The wireless communication method according to claim 13, further comprising:
setting the value of the 2-bit sounding reference signal request field to a first value in a case that the base station apparatus requests a mobile station apparatus to transmit a sounding reference signal configured by a first set of the plurality of sets;
setting the value of the 2-bit sounding reference signal request field to a second value in a case that the base station apparatus requests the mobile station apparatus to transmit a sounding reference signal configured by a second set of the plurality of sets; and
setting the value of the 2-bit sounding reference signal request field to a third value in a case that the base station apparatus requests the mobile station apparatus not to transmit a sounding reference signal.

15. The wireless communication method according to claim 14, further comprising:
setting the value of the 1-bit sounding reference signal request field to a first value in a case that the base station apparatus requests a mobile station apparatus to transmit a sounding reference signal configured by a certain set of the plurality of sets; and
setting the value of the 1-bit sounding reference signal request field to a second value in a case that the base station apparatus requests the mobile station apparatus not to transmit a sounding reference signal.

16. The wireless communication method according to claim 14, wherein
the physical downlink control channel including the sounding reference signal request field is used for the scheduling of the physical uplink shared channel with a plurality of antenna ports.

17. An integrated circuit mountable on a mobile station apparatus, the integrated circuit comprising:
a reception circuitry configured to receive a physical downlink control channel which is used for scheduling of a physical uplink shared channel and which includes a sounding reference signal request field that indicates whether or not to request transmission of a sounding reference signal, wherein
the reception circuitry is configured to receive a plurality of sets of parameters for the sounding reference signal by using a radio resource control signal, each of the plurality of sets including a parameter related to bandwidth for the transmission of the sounding reference signal, and
the reception circuitry is configured to receive a physical downlink control channel including a 2-bit sounding reference signal request field and a physical downlink control channel including a 1-bit sounding reference signal request field, a value of each sounding reference signal request field corresponding to one of the plurality of sets; and
a transmission circuitry configured to transmit the sounding reference signal with a first bandwidth, in a case that one or more information bits corresponding to a first value are set to the 2-bit sounding reference signal request field, wherein
the transmission circuitry is configured to transmit the sounding reference signal with a second bandwidth, in a case that one or more information bits corresponding to a second value are set to the 2-bit sounding reference signal request field.

18. The integrated circuit according to claim 17, further comprising:
the transmission circuitry is configured to transmit a sounding reference signal configured by a first set of the plurality of sets in a case that the value of the 2-bit sounding reference signal request field is a first value,
the transmission circuitry is configured to transmit a sounding reference signal configured by a second set of the plurality of sets in a case that the value of the 2-bit sounding reference signal request field is a second value, and
the transmission circuitry is configured not to transmit a sounding reference signal in a case that the value of the 2-bit sounding reference signal field is a third value.

19. The integrated circuit according to claim 17, further comprising:
the transmission circuitry is configured to transmit a sounding reference signal configured by a certain set of the plurality of sets in a case that the value of the 1-bit sounding reference signal request field is a first value, and
the transmission circuitry is configured not to transmit a sounding reference signal in a case that the value of the 1-bit sounding reference signal request field is a second value.

20. The integrated circuit according to claim 18, wherein
the physical downlink control channel including the 2-bit sounding reference signal request field is used for the scheduling of the physical uplink shared channel with a plurality of antenna ports.

21. An integrated circuit mountable on a base station apparatus, the integrated circuit comprising:
a transmission circuitry configured to transmit a physical downlink control channel which is used for scheduling of a physical uplink shared channel and which includes a sounding reference signal request field that indicates whether or not to request transmission of a sounding reference signal, wherein
the transmission circuitry is configured to set one or more information bits corresponding to a first value to the 2-bit sounding reference signal request field in the physical downlink control channel, in a case that instructing a mobile station apparatus to request transmission of the sounding reference signal with a first bandwidth,
the transmission circuitry is configured to set one or more information bits corresponding to a second value to the 2-bit sounding reference signal request field in the physical downlink control channel, in a case that instructing the mobile station apparatus to request transmission of the sounding reference signal with a second bandwidth,
the transmission circuitry is configured to transmit a plurality of sets of parameters for the sounding reference signal by using a radio resource control signal, each of the plurality of sets including a parameter related to bandwidth for the transmission of the sounding reference signal, and
the transmission circuitry is configured to transmit a physical downlink control channel including a 2-bit sounding reference signal request field and a physical downlink control channel including a 1-bit sounding reference signal request field, a value of each sounding reference signal request field corresponding to one of the plurality of sets.

22. The integrated circuit according to claim 21, wherein
the transmission circuitry is configured to set the value of the 2-bit sounding reference signal request field to a first value in a case that the base station apparatus requests a mobile station apparatus to transmit a sounding reference signal configured by a first set of the plurality of sets,
the transmission circuitry is configured to set the value of the 2-bit sounding reference signal request field to a second value in a case that the base station apparatus requests the mobile station apparatus to transmit a sounding reference signal configured by a second set of the plurality of sets, and
the transmission circuitry is configured to set the value of the 2-bit sounding reference signal request field to a third value in a case that the base station apparatus requests the mobile station apparatus not to transmit a sounding reference signal.

23. The integrated circuit according to claim 22, wherein
the transmission circuitry is configured to set the value of the 1-bit sounding reference signal request field to a first value in a case that the base station apparatus requests a mobile station apparatus to transmit a sounding reference signal configured by a certain set of the plurality of sets, and
the transmission circuitry is configured to set the value of the 1-bit sounding reference signal request field to a second value in a case that the base station apparatus requests the mobile station apparatus not to transmit a sounding reference signal.

24. The integrated circuit according to claim 22, wherein the physical downlink control channel including the sounding reference signal request field is used for the scheduling of the physical uplink shared channel with a plurality of antenna ports.

25. A wireless communication system comprising:
a mobile station apparatus configured to:
   receive a physical downlink control channel which is used for scheduling of a physical uplink shared channel and which includes a sounding reference signal request field that indicates whether or not to request transmission of a sounding reference signal,
   receive a plurality of sets of parameters for the sounding reference signal by using a radio resource control signal, each of the plurality of sets including a parameter related to bandwidth for the transmission of the sounding reference signal, and
   receive a physical downlink control channel including a 2-bit sounding reference signal request field and a physical downlink control channel including a 1-bit sounding reference signal request field, a value of each sounding reference signal request field corresponding to one of the plurality of sets,
   transmit the sounding reference signal with a first bandwidth, in a case that one or more information bits corresponding to a first value are set to the 2-bit sounding reference signal request field,
   transmit the sounding reference signal with a second bandwidth, in a case that one or more information bits corresponding to a second value are set to the 2-bit sounding reference signal request field; and
a base station apparatus configured to:
   transmit a physical downlink control channel which is used for scheduling of a physical uplink shared channel and which includes the sounding reference signal request field that indicates whether or not to request transmission of a sounding reference signal,
   set one or more information bits corresponding to a first value to the 2-bit sounding reference signal request field in the physical downlink control channel, in a case that instructing a mobile station apparatus to request transmission of the sounding reference signal with a first bandwidth,
   set one or more information bits corresponding to a second value to the 2-bit sounding reference signal request field in the physical downlink control channel, in a case that instructing the mobile station apparatus to request transmission of the sounding reference signal with a second bandwidth,
   transmit a plurality of sets of parameters for the sounding reference signal by using a radio resource control signal, each of the plurality of sets including a parameter related to bandwidth for the transmission of the sounding reference signal, and
   transmit a physical downlink control channel including a 2-bit sounding reference signal request field and a physical downlink control channel including a 1-bit sounding reference signal request field, a value of each sounding reference signal request field corresponding to one of the plurality of sets.

26. The wireless communication system according to claim 25, wherein
the mobile station apparatus is configured to transmit a sounding reference signal configured by a first set of the plurality of sets in a case that the value of the 2-bit sounding reference signal request field is a first value,
the mobile station apparatus is configured to transmit a sounding reference signal configured by a second set of the plurality of sets in a case that the value of the 2-bit sounding reference signal request field is a second value,
the mobile station apparatus is configured not to transmit a sounding reference signal in a case that the value of the 2-bit sounding reference signal field is a third value,
the base station apparatus is configured to set the value of the 2-bit sounding reference signal request field to a first value in a case that the base station apparatus requests a mobile station apparatus to transmit a sounding reference signal configured by a first set of the plurality of sets,
the base station apparatus is configured to set the value of the 2-bit sounding reference signal request field to a second value in a case that the base station apparatus requests the mobile station apparatus to transmit a sounding reference signal configured by a second set of the plurality of sets, and
the base station apparatus is configured to set the value of the 2-bit sounding reference signal request field to a third value in a case that the base station apparatus requests the mobile station apparatus not to transmit a sounding reference signal.

27. A wireless communication system according to claim 26, wherein
the mobile station apparatus is configured to transmit a sounding reference signal configured by a certain set of the plurality of sets in a case that the value of the 1-bit sounding reference signal request field is a first value,
the mobile station apparatus is configured not to transmit a sounding reference signal in a case that the value of the 1-bit sounding reference signal request field is a second value, the base station apparatus is configured to set the value of the 1-bit sounding reference signal request field to a first value in a case that the base station apparatus requests a mobile station apparatus to transmit a sounding reference signal configured by a certain set of the plurality of sets, and the base station apparatus is configured to set the value of the 1-bit sounding reference signal request field to a second value in a case that the base station apparatus requests the mobile station apparatus not to transmit a sounding reference signal.

28. A wireless communication system according to claim 26, wherein the physical downlink control channel including the 2-bit sounding reference signal request field is used for the scheduling of the physical uplink shared channel with a plurality of antenna ports.

* * * * *